US012667144B2

(12) United States Patent
Zinn et al.

(10) Patent No.: US 12,667,144 B2
(45) Date of Patent: Jun. 30, 2026

(54) PROTECTIVE COVERINGS AND DRY WIPES COMPRISING METAL NANOPARTICLE AGGLOMERATES FOR INFECTION CONTROL APPLICATIONS AND FORMATION AND USE THEREOF

(71) Applicant: KUPRION INC., San Jose, CA (US)

(72) Inventors: Alfred A. Zinn, Palo Alto, CA (US); Gilman Louie, San Francisco, CA (US); Randall M. Stoltenberg, Palo Alto, CA (US); Nicholas Antonopoulos, San Jose, CA (US)

(73) Assignee: Kuprion Inc., Waterbury, CT (US)

( * ) Notice: Subject to any disclaimer, the term of this patent is extended or adjusted under 35 U.S.C. 154(b) by 795 days.

(21) Appl. No.: 17/995,500

(22) PCT Filed: Apr. 22, 2021

(86) PCT No.: PCT/US2021/028554
§ 371 (c)(1),
(2) Date: Oct. 5, 2022

(87) PCT Pub. No.: WO2021/216815
PCT Pub. Date: Oct. 28, 2021

(65) Prior Publication Data
US 2023/0172292 A1     Jun. 8, 2023

Related U.S. Application Data

(60) Provisional application No. 63/023,624, filed on May 12, 2020, provisional application No. 63/013,732, (Continued)

(51) Int. Cl.
*A41D 13/11* (2006.01)
*A01N 25/06* (2006.01)
(Continued)

(52) U.S. Cl.
CPC .......... *A41D 13/1192* (2013.01); *A01N 25/06* (2013.01); *A01N 25/34* (2013.01); (Continued)

(58) Field of Classification Search
CPC ............... A41D 13/1192; B01D 46/00; B01D 46/0028; B01D 46/0038; B01D 2239/0258
See application file for complete search history.

(56) References Cited

U.S. PATENT DOCUMENTS 7,736,414 B1     6/2010  Zinn
8,105,414 B2     1/2012  Zinn
(Continued)

FOREIGN PATENT DOCUMENTS

CN          1306117 A    *   8/2001
CN       206666906 U    *  11/2017
(Continued)

OTHER PUBLICATIONS

Liu et al. "Laundering durable antibacterial cotton fabrics grafted with pomegranate-shaped polymer wrapped in silver nanoparticle aggregations". Sci Rep 4, 5920 (2014). https://doi.org/10.1038/srep05920 Accessed on Jul. 2025 (Year: 2014).*
(Continued)

*Primary Examiner* — Joseph D. Boecker
*Assistant Examiner* — Jaeick Jang
(74) *Attorney, Agent, or Firm* — Carmody Torrance Sandak & Hennessey LLP

(57) ABSTRACT
Protective coverings having metal nanoparticle agglomerates adhered thereto may be applied to a surface subject to infection. The protective coverings may comprise a base substrate, and metal nanoparticle agglomerates thereof adhered to the base substrate. The base substrate may be configured for attachment to the surface subject to infection. The surface subject to infection may be a mask or facial
(Continued)

covering in a particular example. The base substrate may be conformable to the surface subject to infection and optionally include mechanical connectors and/or a contact adhesive upon at least one side thereof to promote surface attachment. The protective coverings may be applied to a contaminated touch surface as a temporary protective layer until disinfection has taken place. Alternately, the protective coverings may be used in routine infection control procedures. The protective coverings may be formed by applying a spray formulation comprising metal nanoparticle agglomerates upon a suitable base substrate.

15 Claims, 9 Drawing Sheets

Related U.S. Application Data filed on Apr. 22, 2020, provisional application No. 63/013,745, filed on Apr. 22, 2020.

(51) Int. Cl.

| | | |
|---|---|---|
| *A01N 25/34* | (2006.01) |
| *A01N 59/16* | (2006.01) |
| *A01P 1/00* | (2006.01) |
| *A62B 23/02* | (2006.01) |

(52) U.S. Cl.
CPC ............... *A01N 59/16* (2013.01); *A01P 1/00* (2021.08); *A41D 13/1115* (2013.01); *A62B 23/025* (2013.01); *B01D 2239/0442* (2013.01)

(56) References Cited

U.S. PATENT DOCUMENTS

| | | | |
|---|---|---|---|
| 8,192,866 | B2 | 6/2012 | Golightly et al. |
| 8,486,305 | B2 | 7/2013 | Zinn et al. |
| 8,834,747 | B2 | 9/2014 | Zinn |
| 9,005,483 | B2 | 4/2015 | Zinn et al. |
| 9,095,898 | B2 | 8/2015 | Zinn |
| 9,700,940 | B2 | 7/2017 | Zinn | |
| 2007/0051370 | A1* | 3/2007 | Baker | A41D 13/11 |
| | | | | 128/206.19 |
| 2008/0264259 | A1 | 10/2008 | Leung | |
| 2008/0305136 | A1* | 12/2008 | Yang | A01N 59/16 |
| | | | | 424/407 |
| 2010/0040655 | A1 | 2/2010 | Ren et al. | |
| 2012/0325843 | A1* | 12/2012 | Tsuei | A62B 23/025 |
| | | | | 221/303 |
| 2013/0091611 | A1 | 4/2013 | Ren et al. | |
| 2015/0292126 | A1* | 10/2015 | Prosser | G06F 3/041 |
| | | | | 442/123 |
| 2016/0015098 | A1 | 1/2016 | Conlon | |
| 2016/0083901 | A1* | 3/2016 | Niedermeyer | G02B 5/28 |
| | | | | 252/588 |
| 2016/0201183 | A1 | 7/2016 | Zinn | |
| 2018/0117370 | A1* | 5/2018 | Seo | A62B 23/025 |
| 2019/0224599 | A1 | 7/2019 | Shin | |

FOREIGN PATENT DOCUMENTS

| | | | | | | |
|---|---|---|---|---|---|---|
| JP | 2000197711 | A | * | 7/2000 | | |
| JP | 2003221304 | A | | 8/2003 | | |
| JP | 3137296 | U | * | 11/2007 | | |
| JP | 2009526828 | A | | 7/2009 | | |
| KR | 20080067109 | A | * | 7/2008 | ............. | B22F 1/054 |
| KR | 20160021177 | A | * | 2/2016 | ......... | B01D 39/1607 |
| KR | 101848494 | B1 | | 4/2018 | | |
| KR | 20180003445 | U | * | 12/2018 | ............. | A62B 23/02 |
| RU | 2693832 | C1 | | 7/2019 | | |
| UA | 91619 | C2 | * | 8/2010 | | |
| WO | 2016115237 | A1 | | 7/2016 | | |
| WO | 2018009353 | A1 | | 1/2018 | | |

OTHER PUBLICATIONS

Machine Translation of CN-1306117-A. Accessed from PE2E Search tool on Nov. 2025. (Year: 2001).*

Written Opinion and International Search report from corresponding PCT Application No. PCT/US2021/028554 mailed Aug. 5, 2021.

* cited by examiner

Guanine N⁷ position

40

42     42

PROTECTIVE COVERINGS AND DRY WIPES COMPRISING METAL NANOPARTICLE AGGLOMERATES FOR INFECTION CONTROL APPLICATIONS AND FORMATION AND USE THEREOF

BACKGROUND

The world is facing increasing threats from antibiotic-resistant strains of bacteria (i.e., "super bugs") that cannot be effectively treated due, at least in part, to the overuse of antibiotics. Other types of resistant microorganisms can present similar issues. Increased population densities and efficient mass transit infrastructure have also contributed significantly to both localized and global spread of various diseases, including both common and emerging diseases. Common influenza and emerging viruses such as coronaviruses represent a significant health threat in this respect. Indeed, the ongoing COVID-19 pandemic represents one of the most significant health threats seen over the past century. Secondary transmission of COVID-19 infections in densely occupied spaces, including those having plentiful touch surfaces, has proven especially problematic for this pathogen.

The current COVID-19 pandemic has disrupted normal supply chains and overwhelmed available space in hospitals and other medical facilities in some cases. Masks and other types of personal protective equipment remain in short supply, especially medical grade masks (N-95 and higher). These factors have created a growing risk of secondary infection transmission among both caregivers and patients, as well as within the general public at large. Oftentimes, the source of secondary infections may result from touch surfaces upon which a pathogen is deposited and then spread to another host. Secondary infection transmission of this type may be prevalent with COVID-19. Although rigorous disinfection practices may aid in limiting secondary transmission of infections, they are rarely good enough to stop the cycle of pathogen transfer entirely. In fact, if disinfection protocols are not followed strictly with appropriate cleaning agents, they may instead undesirably spread a pathogen to still further surfaces and extend the infection transmission cycle. Moreover, there may not be adequate time or personnel to disinfect all possible surfaces upon which a pathogen may become inadvertently deposited during daily activities.

Contaminated masks and similar facial coverings may be a part of an infection transmission cycle as well, especially as ongoing supply chain limitations have necessitated reuse of masks and other personal protective equipment in some cases. The high surface area of masks and the moist environment generated by passage of exhaled breath therethrough can create a fertile breeding ground for bacteria or other pathogens trapped therein, such as viruses. Recent investigations have found that viruses may survive for up to 7 days on a mask surface, which may make masks a prime vector for pathogen transmission to touch surfaces as a wearer adjusts the mask. As such, masks and similar facial coverings need to be handled carefully when worn from one area and to another to prevent cross-contamination, particularly as the mask ages and the risk of contamination grows.

Some types of surfaces are inherently inactivating toward certain viruses and bacteria, such as certain metal surfaces. Copper surfaces, for example, may promote viral inactivation within about 4 hours. Many touch surfaces, however, do not convey significant biocidal activity against bacteria and viruses, which may remain viable upon a touch surface for days at a time after their deposition, wherefrom they may further spread. Although various types of articles having a touch surface may be manufactured with biocidal activity in mind, doing so can significantly increase production costs. In other instances, it may not be possible to manufacture an article with a biocidal touch surface, or the cost of doing so may be extremely prohibitive. Moreover, it may not be evident until an article enters real-world use that the article represents a touch surface source of pathogen transfer. At this point, there is little that can be done to remedy this situation other than establishing even more rigorous infection control and disinfection protocols. Mutated pathogens may be resistant to commonly employed disinfectants as well.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one having ordinary skill in the art and the benefit of this disclosure.

DETAILED DESCRIPTION

Figure 1:
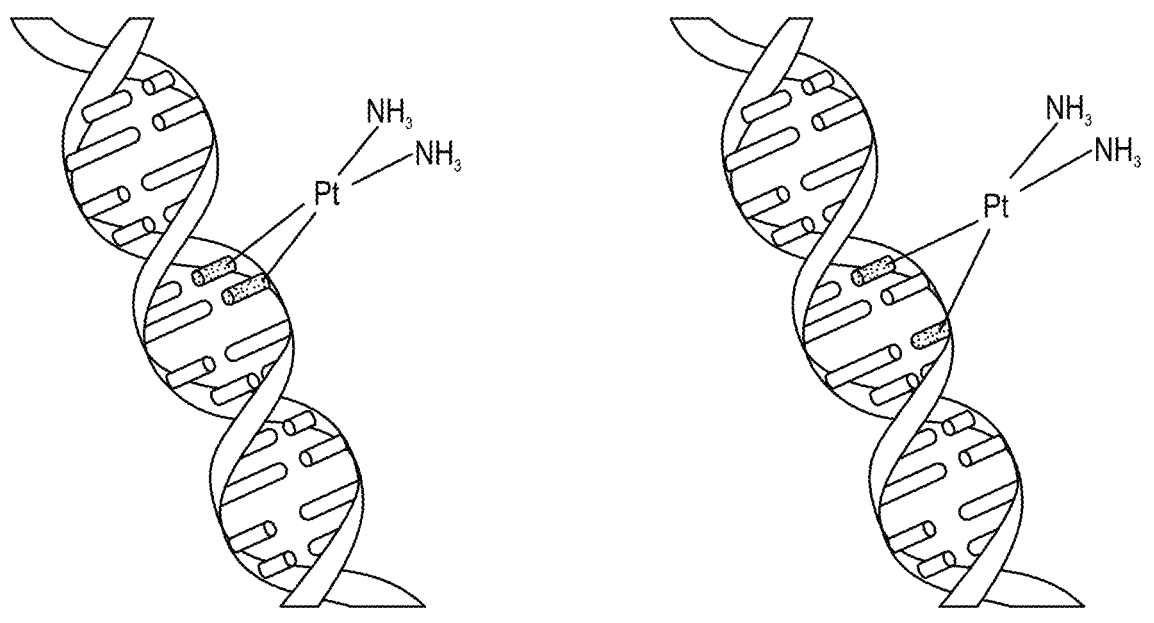
FIG. 1 shows a diagram of the presumed mechanism of action of cisplatin compounds.
Figure 1:
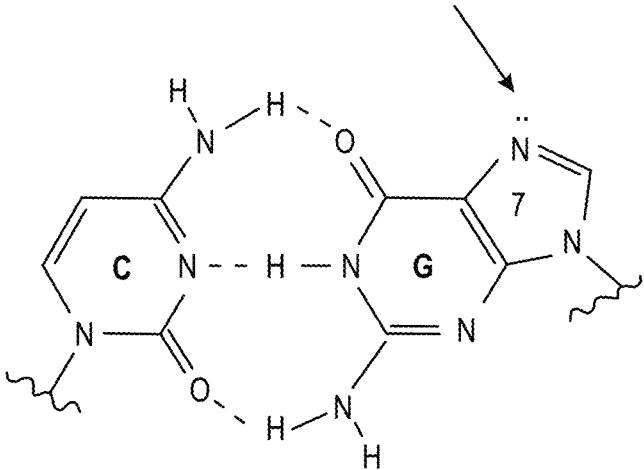

The present disclosure relates to protective coverings and methods for conveying at least temporary protection to surfaces subject to infection (surfaces contaminated with or potentially contaminated with one or more pathogens), such as touch surfaces and personal protective equipment contaminated with bacteria and/or viruses, including coronaviruses. Various configurations of the protective coverings may include forms such as tapes, fabrics, sheets, wraps, and the like containing metal nanoparticle agglomerates adhered thereto. The protective coverings may be at least temporarily applied to a surface subject to infection and in need of having antiseptic activity conveyed thereto. The protective coverings may be impregnated/coated with metal nanoparticle agglomerates and stockpiled until the need arises for conveying antiseptic activity to a surface subject to infection and/or in need of infection control. The protective coverings may be conformal to the shape of the surface subject to infection and optionally may be configured for attachment to the surface, such as via mechanical connectors or an adhesive located upon a base substrate of the protective coverings, particularly a contact adhesive. Long-lasting infection control compared to liquid disinfectants may be realized. The protective coverings may be removed and replaced once they are no longer providing effective infection control or when washing or more rigorous disinfection of a surface is desired. Surfaces containing metal nanoparticle agglomerates, which may have antiseptic properties and be essentially self-sterilizing, are also contemplated herein. Dry wipes for promoting direct surface disinfection are also addressed by the present disclosure.

Metal nanoparticles and their agglomerates, properties of which are addressed in further detail below, represent a highly reactive metal form that may undergo ready adherence to a range of base substrates once deposited in small droplet form thereon. Metal nanoparticle agglomerates may be formulated such that they may be readily applied through spraying or other deposition routes (e.g., painting, dipping, or the like) onto various base substrates in the form of fabrics, tapes, paper, sheets, films, or the like, which may be utilized for temporarily covering a surface in need of infection control. Particularly suitable base substrates may comprise polymer fibers, textile fibers, cellulosic fibers, or any combination thereof. Advantageously, fabrics and other base substrates to which metal nanoparticle agglomerates have been applied may undergo a color change as oxidation and/or breakup of the metal nanoparticle agglomerates occurs, which may provide some indication of loss of efficacy against bacteria and viruses.

In particular examples, the present disclosure provides protective coverings comprising metal nanoparticle agglomerates adhered to a fibrous barrier material, such as a fabric sheet, that may be readily applied to masks and similar facial coverings (e.g., a cloth, scarf, bandana, or the like) to provide enhanced protection for a wearer against various pathogens, such as coronaviruses. Such protective coverings and other protective coverings of the present disclosure (e.g., protective coverings configured for application to other types of touch surfaces) may be readily formed using suitable spray formulations comprising metal nanoparticle agglomerates, as discussed further herein. As used herein, the terms "spray formulation," "antiseptic spray," "disinfectant spray," and similar terms refer to an aerosolizable fluid medium comprising metal nanoparticle agglomerates. The aerosolizable fluid medium may be discharged with an aerosol propellant, such as with a compressed low-boiling fluid, or through pumping or gas pressurization to produce spray droplets. Dip coating, brush-on, or painting techniques may also be suitably used to apply metal nanoparticle agglomerates to the base substrate of a protective covering. Formulations suitable for dip coating, brush-on, or painting may be formulated differently than are formulations suitable for spraying.

Protective coverings of the present disclosure that are configured for application to a mask or similar facial covering may significantly enhance the protective capabilities of surgical masks, dust masks, and other types of facial coverings that may otherwise offer only limited pathogen protection for a wearer. Once the effective lifetime of a protective covering has been exceeded and/or cleaning or disinfection of a mask or facial covering is desired, the protective covering may simply be removed and the mask or facial covering reused and/or cleaned. Thus, the protective coverings of the present disclosure may aid in alleviating supply strain for masks, as well as making such masks and facial coverings more protective for a wearer. Less frequent cleaning, washing, and/or disinfection may be utilized than would otherwise be required if a protective covering was not being used. Even medical grade masks, such as N-95 and higher masks, may similarly benefit from application of the protective coverings described herein, again by enhancing the protective capabilities of the masks and facilitating reuse thereof. For example, a protective covering of the present disclosure may be applied to a mask that might otherwise need to be discarded, thereby facilitating continued use thereof. As a further advantage, the protective coverings of the present disclosure do not appreciably increase the difficulty for a wearer to breathe through a mask or facial covering.

As a further advantage, protective coverings of the present disclosure, when applied to a mask or facial covering, may aid in limiting secondary transmission of infections to a surface after a wearer touches or adjusts the mask or facial covering. Without the exterior of a mask or facial covering being provided with antiseptic activity via a protective covering of the present disclosure, transmission of pathogens to various touch surfaces may otherwise occur unconsciously or inadvertently after touching the mask or facial covering.

In addition to masks and facial coverings, various types of surfaces may become contaminated with viruses and/or bacteria in the normal course of daily activities. Even under ideal circumstances, it may not be possible to maintain a surface (e.g., a touch surface) in a fully decontaminated condition, due to the nature of the surface or its location, the frequency with which the surface becomes contaminated again after cleaning, or any combination thereof. Touch surfaces may represent a major source for secondary transmission of infections. For effective cleaning to be realized, disinfection needs to take place after each touch potentially introducing a pathogen to the surface. Such disinfection frequencies are not practical or possible in many instances, especially in high-traffic locations. The present disclosure may alleviate these difficulties, either by allowing such touch surface to be fabricated directly with antiseptic properties through incorporation of metal nanoparticle agglomerates or via applying a protective covering of the present disclosure thereto. It is to be appreciated that any surface herein that may be protected through applying a protective covering thereto may alternately be rendered antiseptic by incorporating metal nanoparticle agglomerates during manufacturing of the surface. Further alternately, dry wipes comprising metal nanoparticle agglomerates may be utilized for promoting surface disinfection as well.

Silver and copper surfaces both possess antibacterial activity, even against antibiotic-resistant bacteria in some instances. These metals may also promote viral inactivation. Bulk copper surfaces, for instance, may afford viral inactivation in about 4 hours in some cases, including inactivation of coronaviruses. Silver surfaces tend to be less active and the cost of silver relative to copper may be prohibitive. Viruses may otherwise remain viable for up to five to seven days on various surfaces lacking inherent antiseptic activity, such as glass, polymers, ceramics, rubber, paper, cardboard, and stainless steel, for example. Unfortunately, it is difficult to incorporate metallic silver or copper upon the foregoing surface types, including masks or similar facial coverings formed therefrom, due to the high melting point of these metals. Molten copper, for instance, forms at the melting point of copper (1083° C.), a temperature which is completely incompatible with the base materials present in many types of surfaces subject to infection. The melting point of silver is likewise problematically high. Micron-size silver or copper particles or flakes may be produced, but it may be difficult to promote robust adherence of these entities to a surface for maintaining infection control over extended periods of time. In addition, it may be difficult to formulate micron-size metal particles or flakes into a form suitable for rapid dispensation upon a surface, particularly by spraying.

Direct incorporation of metal particles (e.g., copper or silver particles) into fibers during their manufacture may promote antiseptic activity but significantly decrease the strength and durability of the fibers. Moreover, many of the metal particles may become localized inside the fibers, a location which may be much less effective for promoting infection control. Thus, considerably larger amounts of metal particles may be needed to promote effective infection control than if the metal particles were disposed primarily upon the exterior surface of the fibers, where they may be more exposed and active. Even so, effective adherence of metal particles to the exterior of fibers may remain problematic.

Metal nanoparticles, particularly metal nanoparticle agglomerates, are uniquely situated to address the foregoing difficulties, since they are capable of inactivating a wide range of microorganisms and viruses, including coronaviruses, are low toxicity to humans, especially in small amounts, and may be processed into spray formulations or related types of formulations that facilitate ready dispensation onto various types of surfaces to convey antiseptic activity thereto. The terms "biocidal," "infection control" and "antiseptic" may be used synonymously herein. In contrast to bulk metal surfaces, metal nanoparticle agglomerates may offer very rapid rates of inactivation for various pathogens, including coronaviruses, thereby providing enhanced protection against pathogen inhalation through a mask or facial covering and/or transmission of a pathogen to or from a touch surface. In addition, robust adherence of metal nanoparticle agglomerates to fibers and other types of base substrates may be realized, thereby affording significant advantages over micron-size metal particles and flakes. The effective shelf life of the protective coverings disclosed herein may be at least about 1-3 months when sealed to protect from ambient moisture, or even up to about 6 months or more when sealed in an inert atmosphere. Thus, the protective coverings may be readily produced via spraying and stockpiled for deployment upon a surface when needed.

Without being bound by any theory, the mechanism of action of metal nanoparticles against various pathogens may result from biomolecule interaction with the metal nanoparticles. With respect to DNA, the mechanism of action may be similar to that of platinum coordination compounds (e.g., cisplatin, carboplatin, oxaliplatin, and pyriplatin), as illustratively shown in FIG. 1. Advantageously, the mechanism of action of metal nanoparticles may address mutations and antibiotic resistance that are becoming increasingly frequent with common disinfectants and pharmaceuticals. Whereas these agents may function through competitive inhibition, metal nanoparticles may facilitate multiple biocidal pathways and lead to more effective biocidal activity that is more resistant to mutations.

Metal nanoparticles or agglomerates thereof may be incorporated within an article having a touch surface during its manufacture in order to convey antiseptic activity thereto.

However, some articles are not readily manufactured in a manner such that the metal nanoparticles remain in a form suitable for conveying antiseptic activity. Moreover, there may be portions of an article that are more at risk of becoming contaminated with a pathogen than are others during operational use. The present disclosure alleviates this difficulty by providing protective coverings having antiseptic activity and that may be at least temporarily applied to a surface in need of infection control. The protective coverings contain metal nanoparticle agglomerates in an amount sufficient to inactivate at least one type of virus or bacteria once placed upon a surface, such as a touch surface, mask or facial covering, for example. Touch surfaces that may be protected through implementation of the disclosure herein include, for example, door knobs, doors, handrails, countertops, desktops, tabletops, light switches, appliances, computer equipment, keyboards, pens, clip boards, privacy curtains, walls, elevator buttons, door access buttons and keypads, ATM keypads and screens, shopping carts, self-service checkout stations, self-service gas pumps, shoes, gloves, and the like. Long-lasting infection control may be realized, sometimes in a time-release manner.

Dry wipes impregnated with metal nanoparticle agglomerates according to the disclosure herein also may be effectively used to promote disinfection of a surface. Unlike wet disinfectant wipes, dry wipes comprising metal nanoparticles may be utilized multiple times, possibly with long times between uses, before losing effectiveness and needing to be discarded. This feature may lessen waste and disposal concerns, including issues associated with plugging of municipal sewer systems due to improper disposal of wet disinfectant wipes in toilets.

The protective coverings of the present disclosure may be pre-shaped to match the profile of a surface the protective coverings are to be applied upon. Alternately, and more desirably, the protective coverings may be conformal in nature, such as a fabric, film, sheet or tape that assumes the profile of a surface covered therewith, thereby allowing surfaces of various sizes and types and/or masks or facial coverings to be covered at least temporarily for promoting infection control. Paper, cardboard or vinyl protective coverings having metal nanoparticle agglomerates thereon may be used for covering larger, substantially flat touch surfaces such as walls, countertops, and the like. Fabric or polymer sheets or films may similarly be used for covering substantially flat surfaces in need of infection control, as well as surfaces where the base substrate needs to conform to the surface profile in order to provide, infection control. Advantageously, the protective coverings disclosed herein may allow retrofitting of an existing touch surface to take place in an easily implemented and relatively inexpensive manner. Similarly, the protective coverings of the present disclosure may allow a mask or similar facial covering to be enhanced and benefit from increased antiseptic activity.

Protective coverings having metal nanoparticle agglomerates disposed thereon can be fabricated and stockpiled for use when needed. Thus, the protective coverings disclosed herein may represent a new strategy in the realm of personal protective equipment (PPE) and infection control. The protective, coverings may be used to supplement routine infection control protocols, or they may be used when routine disinfection protocols are unable to be performed or a known contamination has occurred and is not able to be currently remediated.

It is also possible to convey antiseptic activity to a touch surface, mask or facial covering by directly spraying metal nanoparticle agglomerates thereon through use of an appropriate spray formulation. Direct spraying of metal nanoparticle agglomerates may be employed, for example, when a protective covering of the present disclosure is unavailable and/or the protective covering does not adequately adhere/conform to a particular surface. When directly spraying metal nanoparticle agglomerates onto a surface, robust adherence of the metal nanoparticle agglomerates thereto may again be realized. Alternative applications of metal nanoparticle agglomerates to a touch surface, such as through dip coating, brush-on, or painting of a liquid dispersion of metal nanoparticle agglomerates may also be suitable for promoting direct disinfection of a touch surface.

In addition to conveying temporary antiseptic activity to surfaces of various types that are subject to infection, the concepts described herein may also be widely applicable to situations in which antiseptic activity is highly desirable. As such, fabrics for use in various applications may be obtained by applying metal nanoparticle agglomerates thereon, and processing the fabrics into a desired form. Various types of articles and fabrics that may benefit from incorporation of metal nanoparticle agglomerates thereon include, for example, carpets, upholstery, bandages, cotton swabs, tents, clothing, gloves, aprons, and the like. Articles used directly for patient or personal care, such as bandages and cotton swabs having metal nanoparticle agglomerates thereon, may afford direct benefits of limiting the occurrence of new infections or addressing an existing infection.

Spray formulations comprising metal nanoparticle agglomerates in an aerosolizable fluid medium may be particularly advantageous for facilitating the foregoing. Protective coverings of the present disclosure may also be produced through dip coating, brush-on, or painting techniques, each of which may utilize a liquid dispersion of metal nanoparticle agglomerates, such as an aqueous fluid medium, in which the metal nanoparticle agglomerates are sufficiently dispersible. In a dip coating operation, a fabric or other base substrate may be continuously drawn through a suitable liquid dispersion (e.g., in a roll-to-roll processing line) and then dried to facilitate adhesion of metal nanoparticle agglomerates. Roll-to-roll processing may also facilitate low-cost, mass market production of the protective coverings. In addition, suitable dip coating formulations may be provided for at-home or batch use for application to existing protective covering otherwise not having metal nanoparticle agglomerates adhered thereto.

Metal nanoparticle agglomerates represent a particularly advantageous construct for incorporating metal onto a protective covering. Copper nanoparticles and/or silver nanoparticles and their agglomerates may be particularly advantageous for promoting disinfection or infection control via a protective covering, given the known biocidal activity of bulk copper and silver surfaces. Nanoparticle forms of these metals may provide an especially advantageous vehicle for introducing metal onto a surface due to robust surface adherence that may be realized when agglomerates of these metal nanoparticles are applied to a surface, such as through spraying, particularly when a spray formulation contains both metal nanoparticle agglomerates and an adhesive. Copper nanoparticles and silver nanoparticles used in combination with one another may afford complementary biocidal against the same or different pathogens than may be targeted or inactivated by each metal individually. Copper may be advantageous relative to silver due to its lower cost, potential lower in vivo toxicity relative to silver, and in vivo function as an essential nutrient and regulator of several biological processes (e.g., protein function, angiogenesis, and energy production). Zinc, nickel, titanium and other bioactive metals, as well as their oxide forms, may be utilized in further combination with either or both of these metals as well and/or oxides of copper and/or silver.

Metal nanoparticles, such as silver and copper nanoparticles, can be readily produced in agglomerated form in a size range that is compatible for processing into spray formulations or alternative liquid formulations that may be suitable for deposition upon a range of surfaces and base substrates. The small size of the metal nanoparticles allows ready dispersion in a fluid medium to be realized and aerosolized droplet formation to take place when depositing the metal nanoparticle agglomerates by spraying. In addition, the small size of metal nanoparticles conveys a high surface energy thereto, which may result in the metal nanoparticle agglomerates becoming surface-adhered following deposition upon a surface or base substrate of a protective covering, thereby providing a robust structure that is capable of repeated handling during use. The high surface energy may afford chemical bond formation to the surface in some instances. An adhesive may further facilitate adherence of metal nanoparticle agglomerates to the surface or protective covering in some cases, as well as provide other advantages, such as a time-release profile of metal nanoparticles, as discussed hereinafter. The metal nanoparticles within metal nanoparticle agglomerates may retain their nanoparticulate structure following deposition on a surface, as also discussed in further detail hereinafter.

As indicated above, an adhesive may further promote adherence of metal nanoparticle agglomerates to a surface, particularly before the metal nanoparticles' high surface energy has afforded more robust surface bonding. The adhesive, which may be permanently tacky, may be applied concurrently with the metal nanoparticles agglomerates (e.g., in a spray formulation) or separately. Application of an adhesive to a surface prior to deposition of metal nanoparticle agglomerates thereon via spraying or another suitable deposition technique may afford initial sequestration of the metal nanoparticles during deposition, followed by more robust adherence being realized through surface bonding taking place as a result of the high surface energy of the metal nanoparticles. As a further advantage, an adhesive may promote prolonged release of active metal species from metal nanoparticle agglomerates following their adherence to a surface, as discussed further below. Once metal nanoparticle agglomerates have been introduced to a surface, particularly in the presence of a suitable adhesive, biocidal activity may be maintained over an extended time, such as over a period of days to weeks.

As such, protective coverings of the present disclosure may convey antiseptic activity over an extended period of time once placed upon a surface subject to infection, provided that the protective covering remains adhered to the surface. An underlying pathogenic contaminant may be covered with the protective coverings, thereby limiting the spread of an existing infection and conveying antiseptic activity to the covered surface by virtue of the metal nanoparticle agglomerates. Accordingly, the protective coverings of the present disclosure do not necessarily need to be replaced after each use or contact with a pathogen or other infectious agent, and/or they may represent a viable bridge until a more thorough disinfection protocol may be performed.

As used herein, the term "metal nanoparticles" refers to metal particles that are about 250 nm or less in size, particularly about 200 nm or less in size or about 150 nm or less in size, without particular reference to the shape of the metal particles. Copper nanoparticles are metal nanoparticles comprising predominantly copper, optionally with an oxide coating wholly or partially covering the surface of the copper nanoparticles. Likewise, silver nanoparticles are metal nanoparticles comprising predominantly silver, optionally with an oxide coating wholly or partially covering the surface of the silver nanoparticles. The term "metal nanoparticle" broadly refers herein to any metallic structure having at least one dimension of 250 nm or less, particularly about 200 nm or less in size or about 150 nm or less in size, and includes other structures that are not substantially spherical in nature, such as metal platelets/disks, metal nanowires, or the like. Other metal nanostructures may be used in addition to or as alternatives to spherical or substantially spherical metal nanoparticles, or agglomerates thereof, in the disclosure herein.

The term "metal nanoparticle agglomerates" and equivalent grammatical forms thereof refers to a grouping of metal nanoparticles having at least one dimension ranging from about 0.1 microns to about 35 microns in size, particularly about 0.1 microns to about 15 microns in size, and more particularly about 0.1 microns to about 5 microns in size. Individual metal nanoparticles within a metal nanoparticle agglomerate may reside within the size ranges indicated above, and the individual metal nanoparticles may be associated with one another through non-covalent, covalent, or metallic bonding interactions. The term "associated" refers to any type of bonding force that holds a grouping of metal nanoparticles together. The bonding force may be overcome to produce individual metal nanoparticles or smaller metal nanoparticle agglomerates in some instances.

The terms "consolidate," "consolidation" and other variants thereof are used interchangeably herein with the terms "fuse," "fusion" and other variants thereof. These terms refer to at least partial coalescence of metal nanoparticles.

Once a surfactant coating has been lost from the surface of metal nanoparticles, as discussed further below, surface oxidation of the metal nanoparticles may occur. Oxidation of metal nanoparticles may also lead to formation of reactive and potentially mobile salt compounds, including oxides, upon a surface or protective covering (e.g., upon a fiber surface). The salt compounds may be present as a surface coating upon at least a portion of the metal nanoparticles. Such salts may include, for example, chlorides, bisulfites and bicarbonates, resulting from chloride in sweat, carbon dioxide or sulfur dioxide in air or breath, or the like. Formation of such salt compounds may be particularly prevalent upon exposure of the metal nanoparticles to a moist environment, as specified in Reactions 1 and 2 below. Dry conditions, in contrast, may favor formation of at least a partial oxide coating upon the surface of the metal nanoparticles, as specified in Reaction 3 below.

$$Cu+\frac{1}{2}O_2+H_2O+2CO_2 \rightarrow Cu(HCO_3)_2 \quad \text{(Reaction 1)}$$

$$Cu+\frac{1}{2}O_2+H_2O+2SO_2 \rightarrow Cu(HSO_3)_2 \quad \text{(Reaction 2)}$$

$$Cu+\frac{1}{2}O_2 \rightarrow Cu_2O \quad \text{(Reaction 3)}$$

The salt compounds may be surfactant-stabilized salt complexes comprising one or more surfactants (e.g., one or more amine surfactants in the case of copper nanoparticles and sufficient salt anions to achieve charge balance). Charge balancing anions may include, for example, halogen, particularly chloride; bisulfite; bicarbonate; acetate; formate; lactate; or the like. The charge balancing anions are relatively labile and may be released to generate open coordination sites for binding DNA, proteins, or like biomolecules. The salt compounds or surfactant-stabilized salt complexes may remain relatively mobile upon the surface of a base substrate and provide a higher effective coverage of metal nanoparticles thereupon compared to if they remained fully fixed in place.

Before further discussing more particular aspects of the present disclosure in more detail, additional brief description of metal nanoparticles and their processing conditions, particularly silver or copper nanoparticles, will first be provided. Metal nanoparticles exhibit a number of properties that can differ significantly from those of the corresponding bulk metal.

One property of metal nanoparticles that can be of particular importance for processing is nanoparticle fusion (consolidation) that occurs at the metal nanoparticles' fusion temperature. As used herein, the term "fusion temperature" refers to the temperature at which a metal nanoparticle liquefies, thereby giving the appearance of melting. At or above the fusion temperature, consolidation with other metal nanoparticles may readily take place. As used herein, the terms "fusion" and "consolidation" synonymously refer to the coalescence or partial coalescence of metal nanoparticles with one another to form a larger mass. Once disposed upon a surface, individual metal nanoparticles or metal nanoparticles within metal nanoparticle agglomerates may undergo fusion with one another as well, thereby forming a network of at least partially fused metal nanoparticles in either case. In other particular examples, metal nanoparticles in the metal nanoparticle agglomerates may remain unfused to one another when adhered to a surface or present in a spray formulation. Metal nanoparticle agglomerates result when metal nanoparticles associate together prior to deposition upon a surface but individual metal nanoparticles are still identifiable.

Advantageously and surprisingly, metal nanoparticle agglomerates, such as those containing silver and/or copper nanoparticles, can become adhered to various surfaces and base substrates of protective coverings even well below their fusion temperature, thereby allowing surface bonding to take place, as discussed further herein. Dry wipes may be fabricated similarly. Depending on the density at which the silver and/or copper nanoparticles are loaded onto a base substrate and the temperature at which they are processed thereon, individual metal nanoparticles may or may not be further fused together when adhered thereto. Desirably, the metal nanoparticles may remain at least partially unfused to facilitate time-release of metal nanoparticles and metal nanoparticle clusters (smaller agglomerates) from larger metal nanoparticle agglomerates. Oxidized forms of metal nanoparticles or metal nanoparticle clusters may be released from metal nanoparticle agglomerates upon a surface as well. When applying metal nanoparticle agglomerates to the base substrate of a protective covering (e.g., tapes, fabrics, sheets, films, paper or the like, comprising polymer fibers, textile fibers, cellulosic fibers, or the like) further heating may or may not be performed, depending upon the extent of metal nanoparticle fusion that is desired. The temperature may remain sufficiently low that the metal nanoparticles do not become fused together while being further processed. Even when metal nanoparticles remain as individual metal nanoparticles or agglomerates thereof, robust adherence to the base substrate may be realized.

When seeking to facilitate biocidal activity, metal nanoparticle agglomerates may be advantageous in several respects compared to individual metal nanoparticles. Individual metal nanoparticles, particularly metal nanoparticles smaller than about 50 nm or about smaller than about 20 nm, may react and lose their biocidal activity rather quickly.

Metal nanoparticle agglomerates, in contrast, are more stable and may convey a time-release profile of individual metal nanoparticles that is sustained over multiple days, up to about 30 days, for instance. Metal nanoparticle agglomerates of different sizes may extend the range over which suitable biocidal activity may be displayed. In addition, metal nanoparticle agglomerates have a tortuous, complex surface that provides a high surface area for capturing bacteria, viruses, and other pathogens, and promoting inactivation thereof.

Upon decreasing in size, particularly below about 20 nm in equivalent spherical diameter, the temperature at which metal nanoparticles undergo liquification drops dramatically from that of the corresponding bulk metal. For example, copper nanoparticles having a size of about 20 nm or less can have fusion temperatures of about 220° C. or below, or about 200° C. or below, or even about 175° C. or below in comparison to bulk copper's melting point of 1083° C. Silver nanoparticles may similarly display a significant deviation from the melting point of bulk silver below a nanoparticle size of about 20 nm. Thus, the consolidation of metal nanoparticles taking place at the fusion temperature as a result of the high surface energy can allow structures containing bulk metal to be fabricated at significantly lower processing temperatures than when working directly with the bulk metal itself as a starting material. More specifically, bulk metal may be dispersed upon various surfaces that would otherwise be thermally incompatible with the processing temperatures required to introduce molten metal thereon. The small particle sizes of the metal nanoparticle agglomerates may promote ready dispersion within various fluid media for application to the surface of a base substrate of a protective covering. Once deposited upon a base substrate, metal nanoparticle agglomerates may become strongly adhered to the base substrate even without being raised above the fusion temperature and forming bulk metal, as described further hereinbelow. Adherence may be further promoted by an adhesive, as also discussed further herein.

A number of scalable processes have been developed for producing bulk quantities of metal nanoparticles in a targeted size range. Most typically, such processes for producing metal nanoparticles take place by reducing a metal precursor in the presence of one or more surfactants. The as-isolated metal nanoparticles may have a surfactant coating thereon and be isolated as a plurality of nanoparticle agglomerates. The agglomerates may be broken apart, while retaining the surfactant coating, or the agglomerates may be used directly without further processing. Particularly advantageous metal nanoparticle agglomerates for promoting infection control may include metal nanoparticles ranging from about 50 nm to about 250 nm in size, or about 50 nm to about 150 nm in size. The agglomerates may convey a time-release profile of providing individual metal nanoparticles or smaller metal nanoparticle clusters upon a surface. Surfactant loss from individual metal nanoparticles and activation thereof may take place, particularly in the presence of moisture. While present, the surfactants themselves may facilitate surface adhesion through van der Waals interactions.

Metal nanoparticles or agglomerates thereof can be isolated and purified from a reaction mixture by common isolation techniques and processed into a suitable formulation for surface dispensation, such as a spray formulation. The surfactant coating of the metal nanoparticles may be removed through gentle heating, gas flow, and/or vacuum (any pressure below atmospheric pressure) once the metal nanoparticles have been deposited upon a surface, thereby affording a much higher surface energy and a commensurate increase in reactivity and biocidal activity. Alternately, the surfactant coating may be lost upon extended contact with the surface without undergoing additional heating or other processing, with surface adherence occurring with surfactant loss. The surfactant coating may also remain for at least some period of time upon the surface, such that the metal nanoparticles are retained as individuals. Once the surfactant coating has been removed, the high surface energy of the metal nanoparticles may facilitate adherence of the metal nanoparticles to the surface. The metal nanoparticles may or may not become fused together during this process. At least some surface adhesion may also be realized without the surfactant coating being removed.

Metal nanoparticle agglomerates having a range of sizes, such as those within a range of about 0.1 microns to about 35 microns, or about 0.1 microns to about 15 microns, or about 0.1 microns to about 5 microns, or about 0.5 microns to about 5 microns, or about 3 microns to about 5 microns may be advantageous in terms of their ability to be dispersed in an aerosolizable fluid medium and dispensed through aerosol formation or formation of sprayed droplets. Metal nanoparticle agglomerates within these size ranges may also promote retention upon a touch surface or a protective covering for a touch surface. Additional benefits may be realized once the metal nanoparticle agglomerates have become adhered to a protective covering following loss of a surfactant coating or through bonding to an adhesive layer. In particular, metal nanoparticle agglomerates may "shed" individual metal nanoparticles or small clusters of metal nanoparticles that are highly active and possess a significant degree of biocidal activity. Once released, the individual metal nanoparticles or small clusters of metal nanoparticles may migrate over the surface but without being released therefrom. Metal nanoparticle agglomerates having different agglomerate sizes may release metal nanoparticles and even smaller clusters of metal nanoparticles at different rates. By differentially releasing metal nanoparticles from metal nanoparticle agglomerates having a range of sizes, a time-release profile of metal nanoparticles upon a base substrate may be realized to afford prolonged and rapid infection control and disinfection capabilities. Released metal nanoparticles or small clusters thereof may migrate over a surface to afford biocidal coverage that is more complete than the actual coverage density of the metal nanoparticle agglomerates upon the surface. Thus, the metal nanoparticles may inactivate pathogens in close vicinity of the surface of a base substrate, so long as metal nanoparticle agglomerates are sufficiently close by to the location where the pathogen resides. Efficacy over the period of time-release may be based upon the total loading of metal nanoparticle agglomerates per unit area. Thus, depending on coverage density and metal nanoparticle agglomerate size, among other factors, biocidal activity against various pathogens may be retained over several days, such as at least about 3 days, or at least about 5 days, or at least about 7 days, or at least about 10 days, or at least about 14 days, or at least about 21 days, or at least about 30 days. An adhesive layer in contact with the metal nanoparticle agglomerates may further facilitate a time-release profile of metal nanoparticles for conveying biocidal activity. Suitable adhesives within an adhesive layer are not considered to be particularly limited and are specified in more detail below.

Any suitable technique can be employed for forming the metal nanoparticles used in the disclosure herein. Particularly facile metal nanoparticle fabrication techniques, particularly for copper nanoparticles, are described in U.S. Pat.

Nos. 7,736,414, 8,105,414, 8,192,866, 8,486,305, 8,834, 747, 9,005,483, 9,095,898, and 9,700,940, each of which is incorporated herein by reference in its entirety. Similar procedures may be used for synthesizing silver nanoparticles. As described therein, metal nanoparticles can be fabricated in a narrow size range by reduction of a metal salt in a solvent in the presence of a suitable surfactant system, which can include one or more different surfactants. Further description of suitable surfactant systems follows below. Tailoring of the surfactant system, the reaction concentration, temperature, and like factors may determine the size range of metal nanoparticles that are obtained from a metal nanoparticle synthesis. Without being bound by any theory or mechanism, it is believed that the surfactant system can mediate the nucleation and growth of the metal nanoparticles, limit surface oxidation of the metal nanoparticles while the surfactant system is adhered thereto, and/or inhibit metal nanoparticles from extensively aggregating with one another prior to being at least partially fused together. As noted above, small agglomerates of metal nanoparticles may be formed in many instances. Suitable organic solvents for solubilizing metal salts and forming metal nanoparticles can include, for example, formamide, N,N-dimethylformamide, dimethyl sulfoxide, dimethylpropylene urea, hexamethylphosphoramide, tetrahydrofuran, glyme, diglyme, triglyme, tetraglyme, proglyme, or polyglyme. Reducing agents suitable for reducing metal salts and promoting the formation of metal nanoparticles can include, for example, an alkali metal in the presence of a suitable catalyst (e.g., lithium naphthalide, sodium naphthalide, or potassium naphthalide) or borohydride reducing agents (e.g., sodium borohydride, lithium borohydride, potassium borohydride, or tetraalkylammonium borohydrides).

Figure 2:
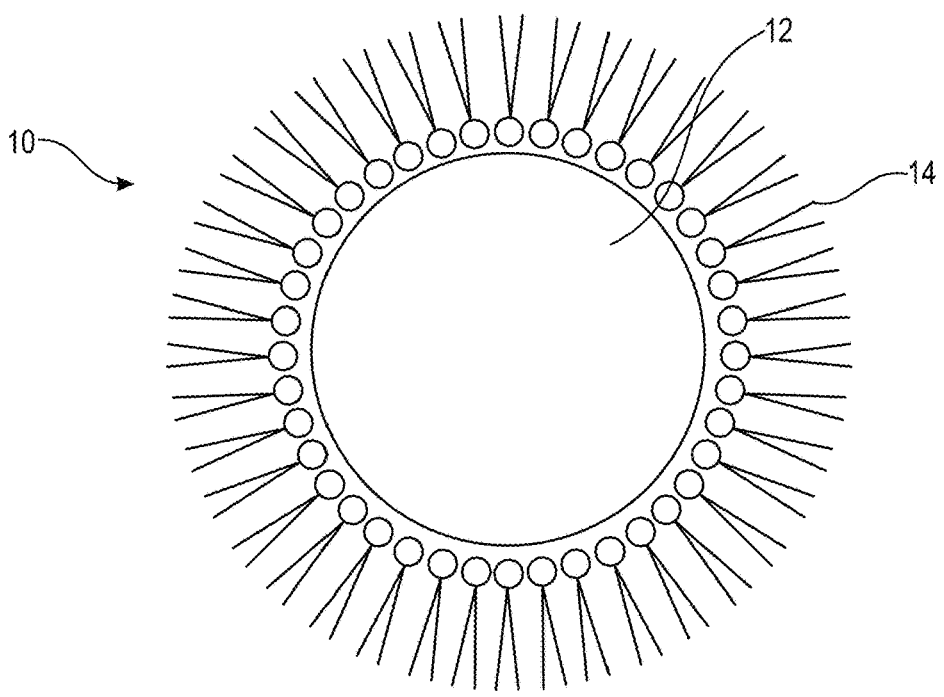
FIGS. 2 and 3 show diagrams of presumed structures of metal nanoparticles having a surfactant coating thereon.
Figure 3:
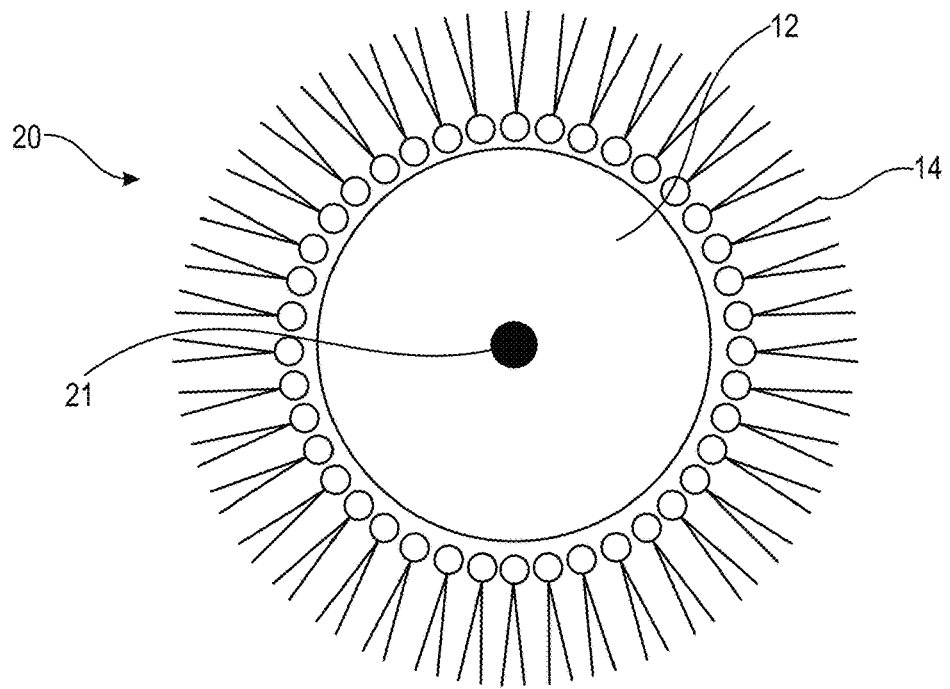
Figure 4:
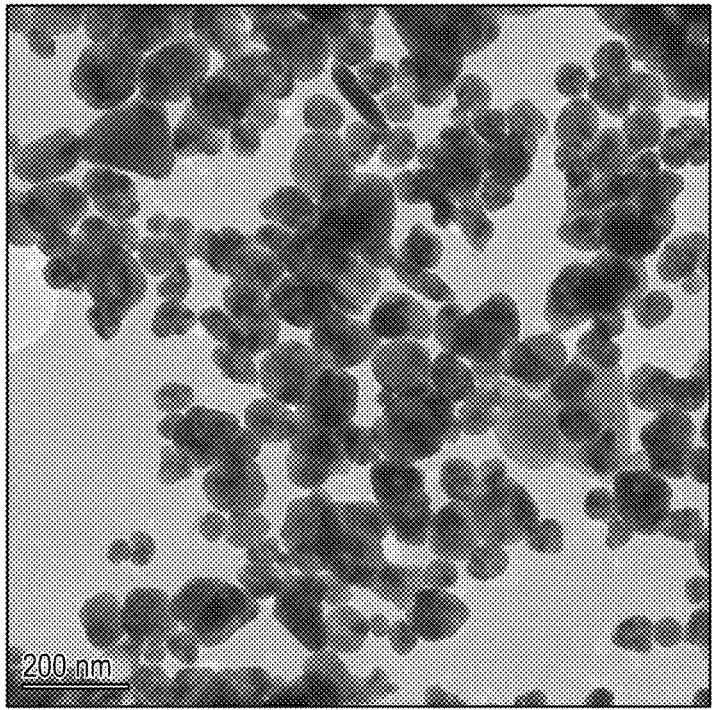
FIG. 4 shows an illustrative SEM image of substantially individual copper nanoparticles.
Figure 5:
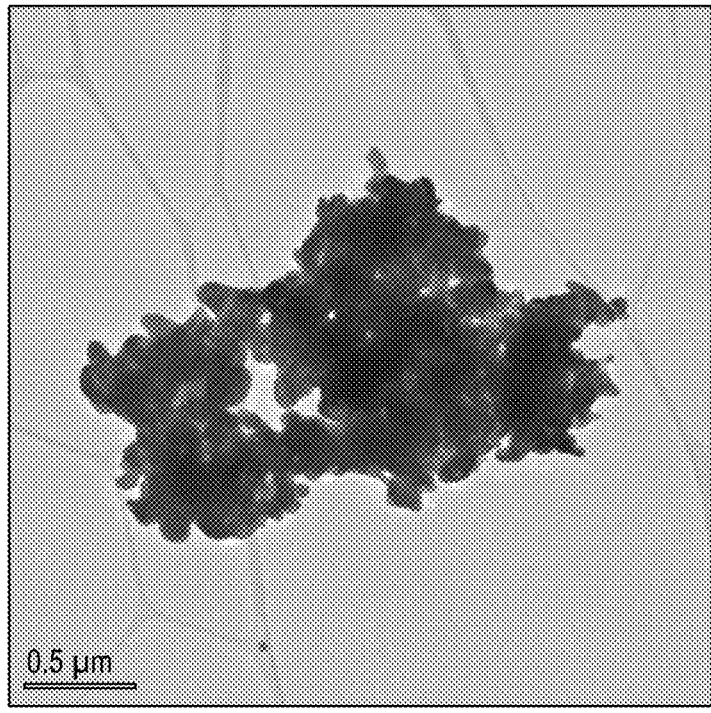
FIG. 5 shows an illustrative SEM image of an agglomerate of copper nanoparticles.
Figure 6:
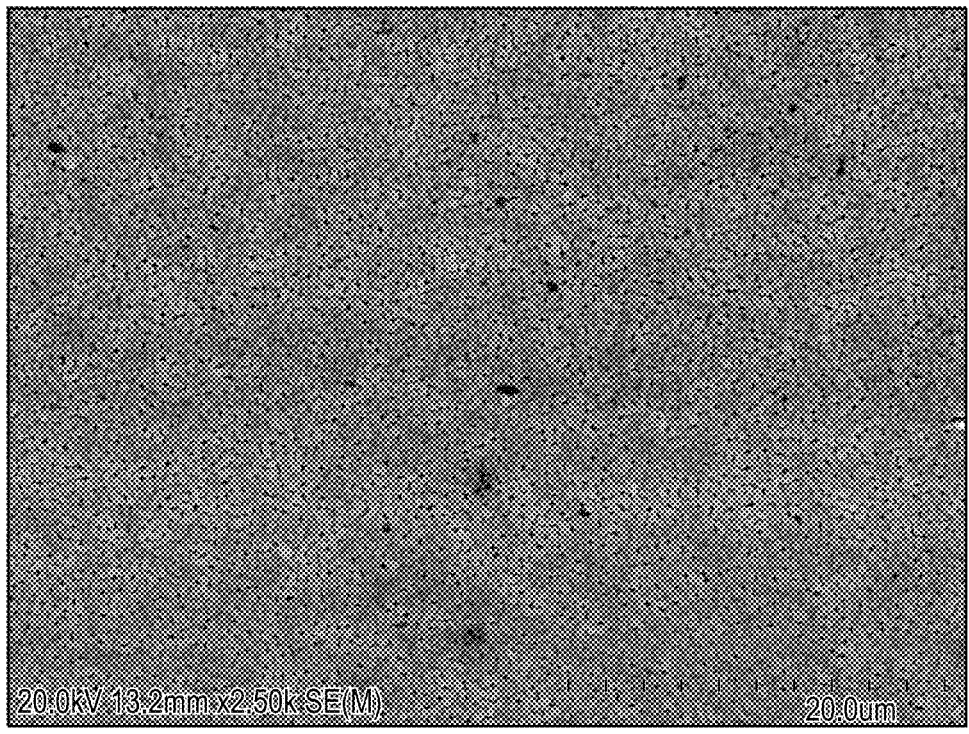
FIG. 6 shows an illustrative SEM image of a copper nanoparticle network obtained after fusion of a plurality of copper nanoparticles to each other.
Figure 7A:
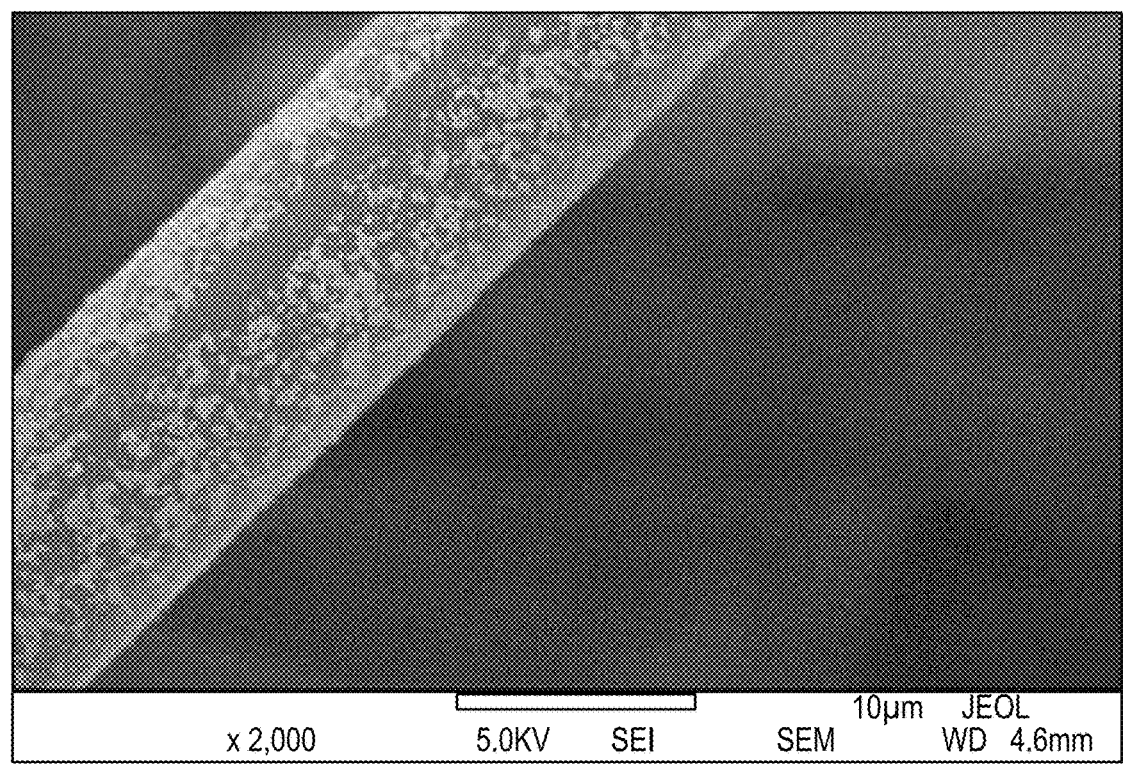
FIGS. 7A and 7B show illustrative SEM images of copper nanoparticles disposed upon fibers of a mask.
Figure 7B:
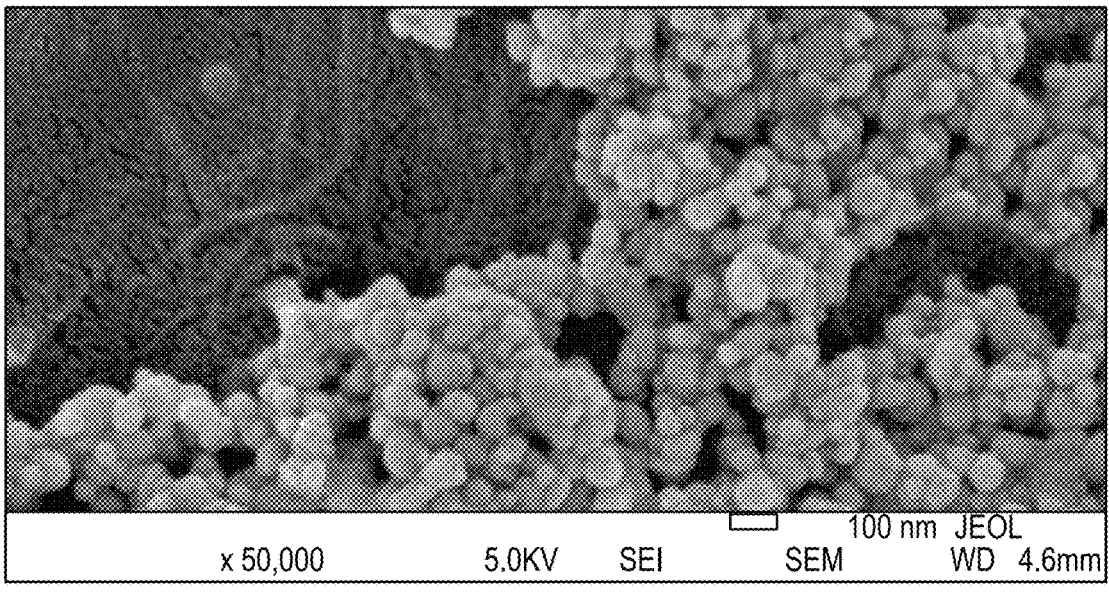

FIGS. 2 and 3 show diagrams of presumed structures of metal nanoparticles having a surfactant coating thereon. As shown in FIG. 2, metal nanoparticle 10 includes metallic core 12 and surfactant layer 14 overcoating metallic core 12. Surfactant layer 14 can contain any combination of surfactants, as described in more detail below. Metal nanoparticle 20, shown in FIG. 3, is similar to that depicted in FIG. 2, except metallic core 12 is grown about nucleus 21. Because nucleus 21 is buried deep within metallic core 12 in metal nanoparticle 20 and is very small in size, it is not believed to significantly affect the overall nanoparticle properties. Nucleus 21 may comprise a salt or a metal, wherein the metal may be the same as or different than metallic core 12. In some embodiments, the nanoparticles can have an amorphous morphology. FIGS. 2 and 3 may be representative of the microscopic structure of copper or silver nanoparticles suitable for use in the disclosure herein. FIG. 4 shows an illustrative SEM image of substantially individual copper nanoparticles. FIG. 5 shows an illustrative SEM image of an agglomerate of copper nanoparticles, which may be used in the disclosure herein. FIG. 6 shows an illustrative SEM image of a copper nanoparticle network obtained after fusion of a plurality of copper nanoparticles to each other. FIGS. 7A and 7B show illustrative SEM images of copper nanoparticles adhered to the surface of a mask following spraying thereon. The copper nanoparticles are robustly adhered to textile fibers of the mask surface but do not undergo fusion with one another. The adherence of copper nanoparticles to the textile fibers of a mask may be representative of the adherence of metal nanoparticle agglomerates to a base substrate according to the disclosure herein.

As discussed above, the metal nanoparticles have a surfactant coating containing one or more surfactants upon their surface. The surfactant coating can be formed on the metal nanoparticles during their synthesis. Formation of a surfactant coating upon metal nanoparticles during their synthesis can desirably limit the ability of the metal nanoparticles to fuse to one another prematurely, limit agglomeration of the metal nanoparticles to a desired extent or agglomerate size, and promote the formation of a population of metal nanoparticles having a narrow size distribution. At least partial loss of the surfactant coating may occur upon heating the metal nanoparticles up to the fusion temperature, including at least some surfactant loss well below the fusion temperature for low-boiling surfactants. Surfactant loss may be further promoted by flowing gas and/or application of vacuum (reduced pressure), as desired, even below the fusion temperature. At least some surfactant loss may occur, given sufficient time, at room temperature and ambient pressure conditions in some instances when the metal nanoparticles are deposited upon a base substrate. Following surfactant loss, fusion of the metal nanoparticles may take place above or below the fusion temperature. If uncoated metal nanoparticles are not heated above the fusion temperature, a high surface energy may be obtained, which may promote adherence of the metal nanoparticles to the base substrate of a protective covering or dry wipe or to a touch surface. The metal nanoparticles may become adhered to a base substrate of a protective covering even below the fusion temperature once the surfactant coating has been removed. When heated above the fusion temperature, nanoparticle fusion may take place in combination with the metal nanoparticles becoming adhered to a base substrate of a protective covering. When copper nanoparticles and silver nanoparticles are present upon a surface together, fusion between the copper nanoparticles and the silver nanoparticles may occur as well. Combinations of copper nanoparticles and silver nanoparticles may afford particular synergy against pathogens not remediated adequately with a single metal alone, including conveying biocidal activity against different pathogens and/or enhancing activity against a particular pathogen.

Various types of metal nanoparticles may be synthesized by metal reduction in the presence of one or more suitable surfactants, such as copper nanoparticles or silver nanoparticles. Copper and/or silver can be particularly desirable metals for use in the embodiments of the present disclosure due to their ability to promote pathogen killing or inactivation when deposited upon a surface. Copper may also be advantageous due to its low cost. Zinc can similarly display biocidal activity against bacteria, viruses and similar microorganisms and may be substituted for copper or silver in any of the embodiments disclosed herein, or used in combination with these metals. NiO and $TiO_2$ may be used similarly in this respect. Nanoparticle forms of Zn, Ni and Ti may be used.

In various embodiments, the surfactant system present within the metal nanoparticles can include one or more surfactants. The differing properties of various surfactants can be used to tailor the properties of the metal nanoparticles and agglomerates thereof. Factors that can be taken into account when selecting a surfactant or combination of surfactants for inclusion upon the metal nanoparticles can include, for example, ease of surfactant dissipation from the metal nanoparticles during or prior to nanoparticle fusion, nucleation and growth rates of the metal nanoparticles to impact the nanoparticle size, the metal component of the metal nanoparticles, and the like. Main group metals, for example, may require different surfactants than do transition metals.

In some embodiments, an amine surfactant or combination of amine surfactants, particularly aliphatic amines, can be present upon the metal nanoparticles. Amine surfactants can be particularly desirable for use in conjunction with copper nanoparticles or silver nanoparticles due to their good affinity for these transition metals. In some embodiments, two amine surfactants can be used in combination with one another. In other embodiments, three amine surfactants can be used in combination with one another. In more specific embodiments, a primary amine, a secondary amine, and a diamine chelating agent can be used in combination with one another. In still more specific embodiments, the three amine surfactants can include a long chain primary amine, a secondary amine, and a diamine having at least one tertiary alkyl group nitrogen substituent. Further disclosure regarding suitable amine surfactants follows hereinafter.

In some embodiments, the surfactant system can include a primary alkylamine. In some embodiments, the primary alkylamine can be a $C_2$-$C_{18}$ alkylamine. In some embodiments, the primary alkylamine can be a $C_7$-$C_{10}$ alkylamine. In other embodiments, a $C_5$-$C_6$ primary alkylamine can also be used. Without being bound by any theory or mechanism, the exact size of the primary alkylamine can be balanced between being long enough to provide an effective inverse micelle structure during synthesis versus having ready volatility and/or ease of handling during nanoparticle consolidation. For example, primary alkylamines with more than 18 carbons can also be suitable for use in the present embodiments, but they can be more difficult to handle because of their waxy character. $C_7$-$C_{10}$ primary alkylamines, in particular, can represent a good balance of desired properties for ease of use.

In some embodiments, the $C_2$-$C_{18}$ primary alkylamine can be n-hexylamine, n-heptylamine, n-octylamine, n-nonylamine, or n-decylamine, for example. While these are all straight chain primary alkylamines, branched chain primary alkylamines can also be used in other embodiments. For example, branched chain primary alkylamines such as, for example, 7-methyloctylamine, 2-methyloctylamine, or 7-methylnonylamine can be used. In some embodiments, such branched chain primary alkylamines can be sterically hindered where they are attached to the amine nitrogen atom. Non-limiting examples of such sterically hindered primary alkylamines can include, for example, t-octylamine, 2-methylpentan-2-amine, 2-methylhexan-2-amine, 2-methylheptan-2-amine, 3-ethyloctan-3-amine, 3-ethylheptan-3-amine, 3-ethylhexan-3-amine, and the like. Additional branching can also be present. Without being bound by any theory or mechanism, it is believed that primary alkylamines can serve as ligands in the metal coordination sphere but be readily dissociable therefrom during metal nanoparticle consolidation.

In some embodiments, the surfactant system can include a secondary amine. Secondary amines suitable for forming metal nanoparticles can include normal, branched, or cyclic $C_4$-$C_{12}$ alkyl groups bound to the amine nitrogen atom. In some embodiments, the branching can occur on a carbon atom bound to the amine nitrogen atom, thereby producing significant steric encumbrance at the nitrogen atom. Suitable secondary amines can include, without limitation, dihexylamine, diisobutylamine, di-t-butylamine, dineopentylamine, di-t-pentylamine, dicyclopentylamine, dicyclohexylamine, and the like. Secondary amines outside the $C_4$-$C_{12}$ range can also be used, but such secondary amines can have undesirable physical properties such as low boiling points or waxy consistencies that can complicate their handling.

In some embodiments, the surfactant system can include a chelating agent, particularly a diamine chelating agent. In some embodiments, one or both of the nitrogen atoms of the diamine chelating agent can be substituted with one or two alkyl groups. When two alkyl groups are present on the same nitrogen atom, they can be the same or different. Further, when both nitrogen atoms are substituted, the same or different alkyl groups can be present. In some embodiments, the alkyl groups can be $C_1$-$C_6$ alkyl groups. In other embodiments, the alkyl groups can be $C_1$-$C_4$ alkyl groups or $C_3$-$C_6$ alkyl groups. In some embodiments, $C_3$ or higher alkyl groups can be straight or have branched chains. In some embodiments, $C_3$ or higher alkyl groups can be cyclic. Without being bound by any theory or mechanism, it is believed that diamine chelating agents can facilitate metal nanoparticle formation by promoting nanoparticle nucleation.

In some embodiments, suitable diamine chelating agents can include N,N'-dialkylethylenediamines, particularly $C_1$-$C_4$ N,N'-dialkylethylenediamines. The corresponding methylenediamine, propylenediamine, butylenediamine, pentylenediamine or hexylenediamine derivatives can also be used. The alkyl groups can be the same or different. $C_1$-$C_4$ alkyl groups that can be present include, for example, methyl, ethyl, propyl, and butyl groups, or branched alkyl groups such as isopropyl, isobutyl, s-butyl, and t-butyl groups. Illustrative N,N'-dialkylethylenediamines that can be suitable for inclusion upon metal nanoparticles include, for example, N,N'-di-t-butylethylenediamine, N,N'-diisopropylethylenediamine, and the like.

In some embodiments, suitable diamine chelating agents can include N,N,N',N'-tetraalkylethylenediamines, particularly $C_1$-$C_4$ N,N,N',N'-tetraalkylethylenediamines. The corresponding methylenediamine, propylenediamine, butylenediamine, pentylenediamine or hexylenediamine derivatives can also be used. The alkyl groups can again be the same or different and include those mentioned above. Illustrative N,N,N',N'-tetraalkylethylenediamines that can be suitable for use in forming metal nanoparticles include, for example, N,N,N',N'-tetramethylethylenediamine, N,N,N',N'-tetraethylethylenediamine, and the like.

Surfactants other than aliphatic amines can also be present in the surfactant system. In this regard, suitable surfactants can include, for example, pyridines, aromatic amines, phosphines, thiols, or any combination thereof. These surfactants can be used in combination with an aliphatic amine, including those described above, or they can be used in a surfactant system in which an aliphatic amine is not present. Further disclosure regarding suitable pyridines, aromatic amines, phosphines, and thiols follows below.

Suitable aromatic amines can have a formula of $ArNR^1R^2$, where Ar is a substituted or unsubstituted aryl group and $R^1$ and $R^2$ are the same or different. $R^1$ and $R^2$ can be independently selected from H or an alkyl or aryl group containing from 1 to about 16 carbon atoms. Illustrative aromatic amines that can be suitable for use in forming metal nanoparticles include, for example, aniline, toluidine, anisidine, N,N-dimethylaniline, N,N-diethylaniline, and the like. Other aromatic amines that can be used in conjunction with metal nanoparticles can be envisioned by one having ordinary skill in the art.

Suitable pyridines can include both pyridine and its derivatives. Illustrative pyridines that can be suitable for inclusion upon metal nanoparticles include, for example, pyridine, 2-methylpyridine, 2,6-dimethylpyridine, collidine, pyridazine, and the like. Chelating pyridines such as bipyridyl chelating agents may also be used. Other pyridines that can be used in conjunction with metal nanoparticles can be envisioned by one having ordinary skill in the art.

Suitable phosphines can have a formula of $PR_3$, where R is an alkyl or aryl group containing from 1 to about 16 carbon atoms. The alkyl or aryl groups attached to the phosphorus center can be the same or different. Illustrative phosphines that can be present upon metal nanoparticles include, for example, trimethylphosphine, triethylphosphine, tributylphosphine, tri-t-butylphosphine, trioctylphosphine, triphenylphosphine, and the like. Phosphine oxides can also be used in a like manner. In some embodiments, surfactants that contain two or more phosphine groups configured for forming a chelate ring can also be used. Illustrative chelating phosphines can include 1,2-bisphosphines, 1,3-bisphosphines, and bis-phosphines such as BINAP, for example. Other phosphines that can be used in conjunction with metal nanoparticles can be envisioned by one having ordinary skill in the art.

Suitable thiols can have a formula of RSH, where R is an alkyl or aryl group having from about 4 to about 16 carbon atoms. Illustrative thiols that can be present upon metal nanoparticles include, for example, butanethiol, 2-methyl-2-propanethiol, hexanethiol, octanethiol, benzenethiol, and the like. In some embodiments, surfactants that contain two or more thiol groups configured for forming a chelate ring can also be used. Illustrative chelating thiols can include, for example, 1,2-dithiols (e.g., 1,2-ethanethiol) and 1,3-dithiols (e.g., 1,3-propanethiol). Other thiols that can be used in conjunction with metal nanoparticles can be envisioned by one having ordinary skill in the art.

The protective coverings of the present disclosure may be adhered to a mask or other facial covering at one or more locations, such as at one or more corners, at one or more sides, or any combination thereof. Attachment may be made to the mask or facial covering at least at two locations, such as at least two corners, at least two sides, or any combination thereof. Adhesives or mechanical connectors may be applied to a face of the protective coverings opposite a face upon which the metal nanoparticle agglomerates are adhered to a base substrate. The adhesives or mechanical connectors may be introduced to the protective coverings during manufacturing, either before or after application of the metal nanoparticle agglomerates to a base substrate. For example, adhesives or mechanical connectors may be introduced to a fabric impregnated with metal nanoparticles following manufacturing thereof, such that an appropriate type of connector may be selected for a given application or type of surface to be covered with the protective coverings.

Mechanical connectors that may be used to adhere the protective coatings to a touch surface, mask or similar facial covering may include, but are not limited to, buttons (e.g., flat buttons, hook and eye connectors, click buttons, brads, or the like), needles, VELCRO, straps (elastic or non-elastic), or the like. In many instances, a complementary structure for mating with a mechanical connector may be located upon a touch surface, mask or similar facial covering to facilitate attachment of the protective covering thereto. For example, a button upon a protective covering may mate with a complementary structure such as a buttonhole, eye hook, snap, loop, or like structure upon a mask or similar facial covering. Alternately, the button or similar structure may be located upon a mask or facial covering, and the complementary structure may be located upon the protective covering. Suitable buttons or similar mechanical connectors may be formed from metal, plastic, or any combination thereof. Some types of mechanical connectors may be configured such that the protective covering may slide over a surface, mask or facial covering and be tensioned in place, such as with an elastic band or fabric band.

In some embodiments, protective coverings of the present disclosure may slide over a mask or similar facial covering, such that the protective coverings are banded or strapped on to the mask or facial covering. Fabric bands or elastic bands, for example, may hold the protective covering in place upon the outer surface of a mask or similar facial covering. The protective coverings may similarly be fabricated in a tubular (cylindrical) form configured to slide over a touch surface, mask or similar facial covering, wherein the cylinder contains metal nanoparticles upon at least a large enough arc to cover a desired area, such as a breath surface of a mask or facial covering, once the protective covering is applied thereto. That is, protective coverings in tubular form may be uniformly coated with metal nanoparticle agglomerates upon the outer surface, or only a portion of the outer surface of the tubular form may be coated with metal nanoparticle agglomerates. For example, the portion of the tubular form contacting the inner surface of a mask or facial covering (i.e., facing a wearer of the mask) may lack metal nanoparticle agglomerates, although they may be optionally present.

The protective coverings may comprise a contact adhesive suitable for promoting adherence of the protective coverings to a surface, mask or facial covering, such that the protective covering may be removed at a later time. Suitable contact adhesives may be included as a continuous or discontinuous border around the face of the protective coverings opposite a face upon which the metal nanoparticle agglomerates are deposited. Double sided adhesive tape may similarly be applied continuously or discontinuously around the border to promote adherence of the protective coverings to a desired surface. Suitable contact adhesives may differ from an adhesive used to promote metal nanoparticle agglomerate adherence to a base substrate, and may have a composition acceptable for being in a position to be inhaled (e.g., when a protective covering is applied to a mask or facial covering). Adhesive compositions that may be suitable include those that have low volatility and toxicity, for example. Contact adhesives may be suitable in this regard.

Alternately, the protective coverings may be applied to a surface, mask or facial covering by applying adhesive tape to a face of the protective covering opposite the face contacting a touch surface, mask or facial covering (i.e., by applying tape over a portion of the front face of the protective covering and extending onto a touch surface, mask or facial covering). Other types of suitable attachments from the front face may similarly promote adherence onto a touch surface, mask or facial covering.

Figure 8:
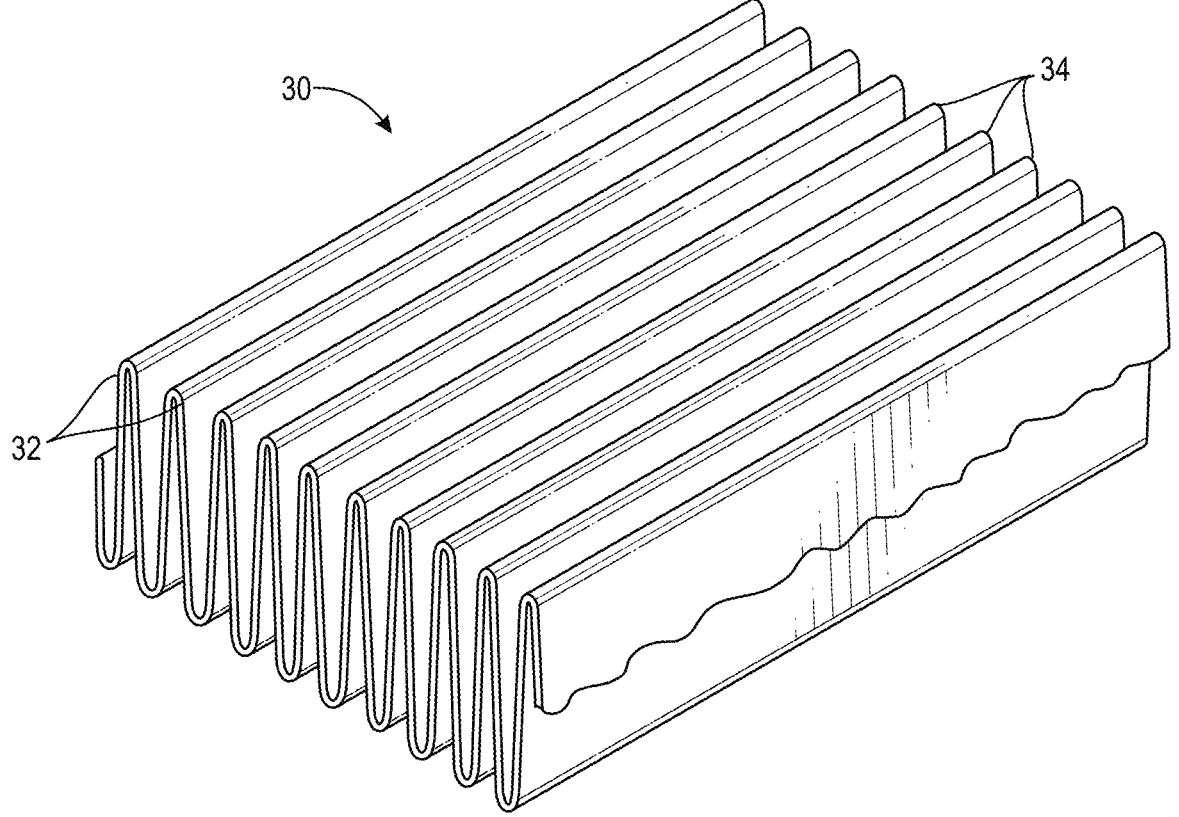
FIG. 8 shows a diagram of a protective covering of the present disclosure having a pleated surface.
Figure 9A:
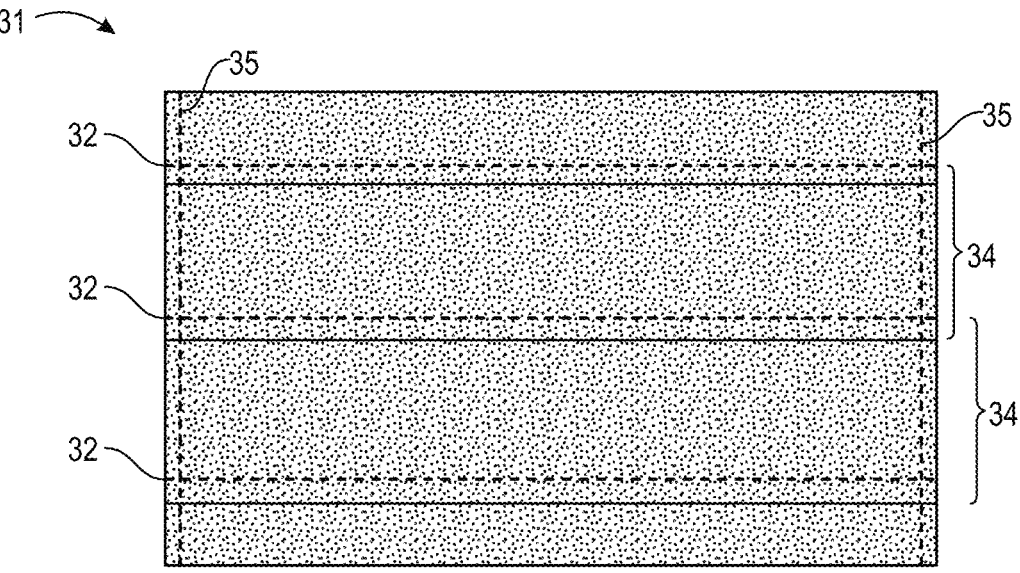
FIGS. 9A and 9B show diagrams of front and rear views of a protective covering of the present disclosure having overlapping pleated layers.
Figure 9B:
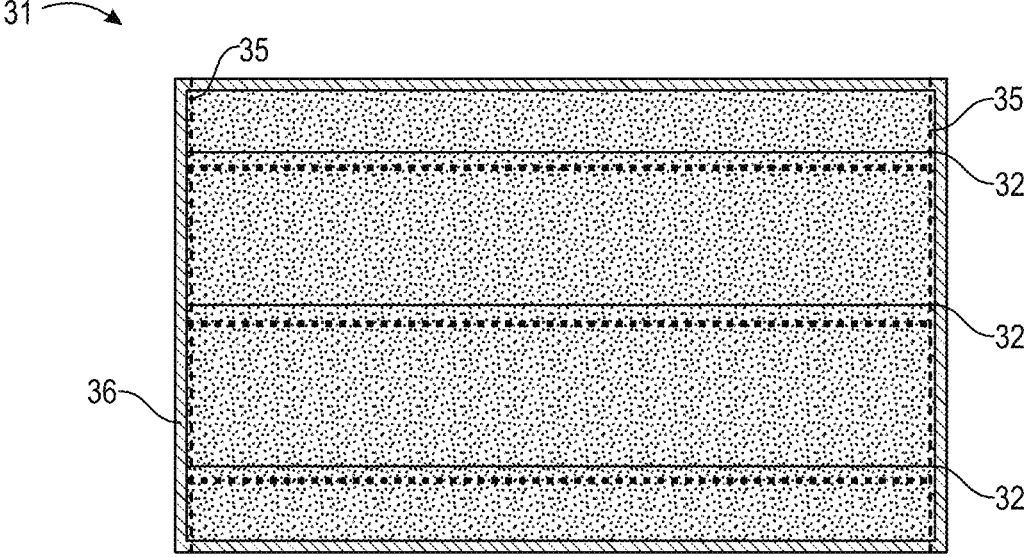
Figure 10A:
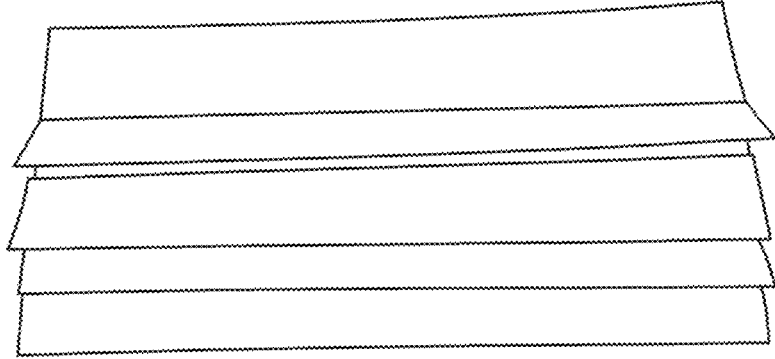
FIGS. 10A and 10B show photographic images of front and rear views of a protective covering of the present disclosure having overlapping pleated layers.
Figure 10B:
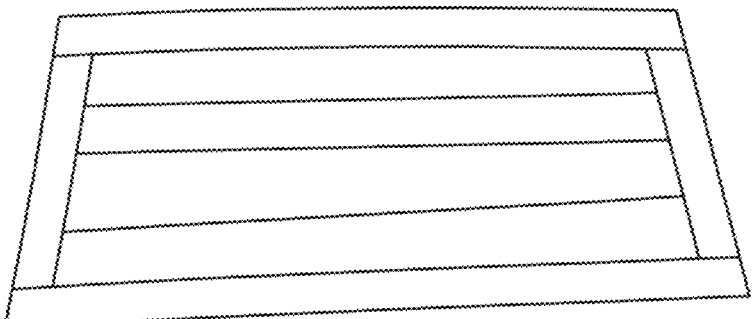
Figure 11:
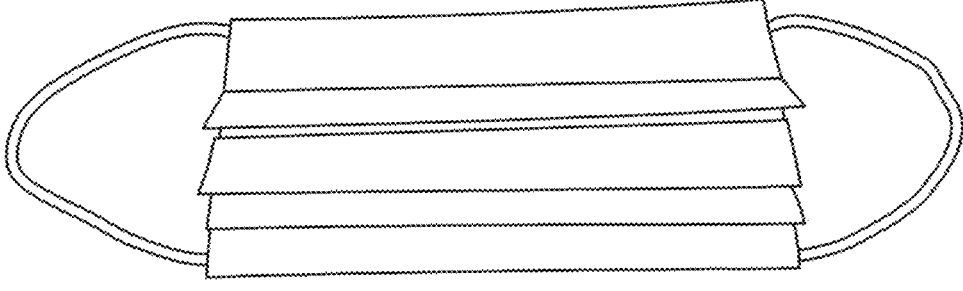
FIG. 11 shows a photographic image of the protective covering of FIGS. 10A and 10B applied to a surgical mask.

The protective coverings may be pleated or unpleated, particularly protective coverings configured for application to a mask or facial covering. Unpleated protective coverings may comprise a substantially flat piece of fabric or other base substrates impregnated with metal nanoparticle agglomerates upon a first face and, optionally, a contact adhesive or mechanical connector upon a second face. An adhesive may be present with the metal nanoparticle agglomerates upon the first face to facilitate adherence thereto. Pleated protective coverings may comprise from 1 to about 10 or 1 to about 5 pleats, which may result in the protective coverings comprising a plurality of overlapping pleated layers, particularly pleated fabric layers. FIG. 8 shows a diagram of protective covering 30 comprising pleats 32 to define plurality of pleated layers 34. A contact adhesive or mechanical connector may be present upon the back side of protective covering 30 (not visible in the depicted view in FIG. 8). Little to no overlap of pleated layers 34 is present in protective covering 30. FIG. 9A shows a front view diagram of protective covering 31, which contains pleats 32 configured such that pleated layers 34 are overlapping with one another. Pleated layers 34 may comprise overlapping pleated fabric layers. Stitching 35 may cross over pleats 32 at the sides of protective covering 31. FIG. 9B shows the corresponding rear view diagram of protective covering 31, in which adhesive 36 lines the perimeter of protective covering 31. Although shown as a continuous border in FIG. 9B, it is to be understood that adhesive 36 may be discontinuous as well and located at any position upon the perimeter of the back side of protective covering 31. FIGS. 10A and 10B show photographic images of the front and back sides, respectively, of illustrative pleated protective coverings of the present disclosure, which contain adhered copper nanoparticle agglomerates and are suitable for attachment to a mask or similar facial covering. A contact adhesive, masked with a pull away covering, is disposed around the perimeter of the back side of the protective covering in FIG. 10B. Suitable contact adhesives are not considered to be particularly limited and may be selected based upon the type of material comprising the mask or similar facial covering. Stitching (not shown) may cross the pleats in the protective covering shown in FIGS. 10A and 10B. FIG. 11 shows a photographic image of the protective covering of FIGS. 10A and 10B applied to a surgical mask.

Figure 12:
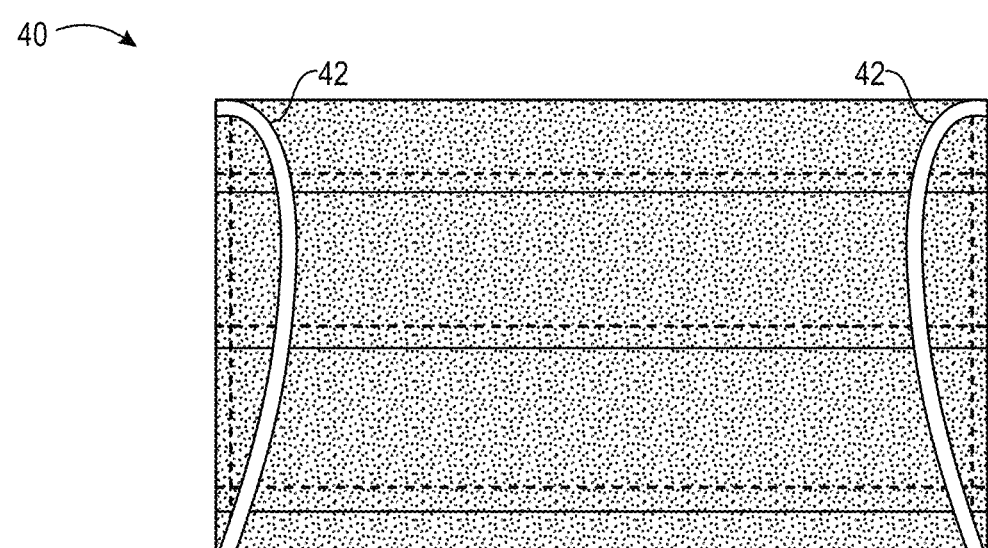
FIG. 12 shows a rear view diagram of a protective covering containing straps.

FIG. 12 shows a rear-view diagram of protective covering 40, in which straps 42 may be used for facilitating attachment to a mask or similar facial covering. It is to be appreciated that straps 42 may also be connected together such that protective covering 40 is in tubular form and may slide over and surround a surface for conveying infection control thereto. For example, a piece of gauze or similar fabric may be sewn or adhered to the back side of protective covering 40 between straps 42 to provide the tubular form. The gauze may or may not include metal nanoparticle agglomerates adhered thereto. Straps 42 may comprise a fabric or elastic sewn on to the back-side face of protective covering 40.

Optionally, metal nanoparticles or agglomerates thereof may also be incorporated upon the face of a base substrate contacting a mask or facial covering (i.e., the back side of the protective covering), wherein the metal nanoparticles upon this face may provide additional pathogen mediation or aid in disinfecting the surface of the mask or facial covering if used previously without the protective covering being present. That is, protective coverings having metal nanoparticle agglomerates on the back side thereof may alleviate pathogens that were previously present on the surface being covered, and metal nanoparticle agglomerates on the front face of the protective coverings may alleviate new pathogens that may come into contact with the protective coverings.

As mentioned above, a distinguishing feature of metal nanoparticles is their high surface energy, particularly after removal of a surfactant coating therefrom, which may promote adherence to various surfaces or protective coverings therefor. A surfactant associated with the metal nanoparticles may further facilitate surface adhesion of metal nanoparticle agglomerates to a base substrate, especially prior to surfactant loss and formation of uncoated metal nanoparticles having a high surface energy.

Metal nanoparticle agglomerates, such as those containing silver nanoparticles and/or copper nanoparticles, may be admixed with an aerosolizable fluid medium in spray formulations suitable for deposition upon a surface according to the disclosure herein. Suitable aerosolizable fluid media and spray formulations are described in greater detail hereinbelow. A surfactant associated with the metal nanoparticles may further facilitate dispersion in the aerosolizable fluid medium and promote surface adherence following deposition on a surface. An adhesive may also be present in the spray formulations and further promote surface adhesion, particularly prior to surfactant loss and formation of uncoated metal nanoparticles having a high surface energy. Adhesives may also be present in related dip coating or brush-on formulations as well. The adhesive may promote extended release of metal nanoparticles from metal nanoparticle agglomerates, as described in further herein.

As-produced metal nanoparticles are usually produced in the form of agglomerates which need to be broken apart into smaller agglomerates and/or individual surfactant-coated metal nanoparticles in order to promote use in various applications. Surprisingly, in the disclosure herein, the as-produced agglomerates, such as those residing in a 0.1-35 micron size range, particularly a 1-15 micron size range, a 0.5-5 micron size range, or a 1-5 micron size range, or a 3-5 micron size range, for example, can be effective for spray dispensation and retention upon a surface. Other liquid dispensation techniques may be suitable as well. Agglomerates of these sizes, and even larger, may be more effectively retained upon a surface than can individual metal nanoparticles or smaller agglomerates. Such agglomerates may change their shape as they adhere to a surface, while remaining bound to each other in a "colony." Within the agglomerates, recognizable sub-structures may be present prior to nanoparticle fusion such as, but not limited to, 10-50 nm thick platelets having a width of about 100-250 nm, 1-5 nm thick platelets having a width of about 30-50 nm, 100-250 nm wide spheres, metal nanowires, the like, or any combination thereof. The sub-structures may have any shape such as square, triangular, rectangular, multi-faceted, round, and ovular, and crystalline, and/or non-crystalline morphologies. Elongate structures, such as metal nanowires, may have an aspect ratio of at least about 10 or at least about 25, for example. Copper nanoparticles and/or silver nanoparticles may also be combined with pre-made nanowires (e.g., copper nanowires or silver nanowires) and deposited upon a surface as well. Zinc, nickel, or titanium, particularly in the form of nanoparticles or a metal oxide form thereof, may be present in any of these embodiments as well.

Protective coverings for surfaces (e.g., a touch surface or a mask or similar facial covering) may comprise a base substrate that is configured for attachment to a surface subject to infection. The base substrate of a protective covering may be complementary to the shape of the surface or is conformable to the surface. Suitable base substrates for protective coverings for surfaces may comprise a polymer (e.g., polymer fibers, polymer films, polymer sheets, or the like, including fabrics, tapes, or the like), a textile (e.g., textile fibers or the like, including fabrics, tapes, or the like), and cellulosic substrates such as paper, cardboard, or the like. Cellulosic substrates may be shaped or flat, with flat cellulosic substrates being desirable for application to substantially flat touch surfaces. Vinyl substrates may also be readily applied to substantially flat touch surfaces, and metal nanoparticle agglomerates thereof may be readily applied thereto. VELCRO substrates may also be used to promote attachment of a protective covering to a surface. VELCRO may also be applied to other types of protective coverings to promote surface attachment thereof.

Particular examples of base substrates may include fabrics comprising a plurality of fibers. Suitable fabrics upon which metal nanoparticle agglomerates may be deposited include, for example, natural or synthetic textile fibers such as polymer fibers, cotton fibers, cellulosic fibers, or the like.

Protective coverings for temporary attachment to a mask or facial covering may comprise a fabric comprising a plurality of fibers, wherein the fabric is sized to cover at least a majority of the breath intake surface of a mask or similar facial covering. The fabric may remain readily conformable after adhering metal nanoparticle agglomerates thereto and may be connected to masks or similar facial coverings having a range of sizes and profile shapes. The fabric may optionally have a temporary adhesive (e.g., a contact adhesive) or mechanical connector located upon the surface of the fabric that contacts the surface of the mask or facial covering. Suitable adhesives and mechanical connectors that may facilitate temporary attachment to a mask or facial covering are described in further detail herein. The adhesive may be applied during manufacturing of the protective coverings or afterward. An adhesive used to promote adhesion of metal nanoparticle agglomerates to the base substrate of a protective covering may differ from an adhesive used to facilitate temporary attachment of the protective covering to a touch surface, mask or facial covering, as also addressed below.

When deposited upon a protective covering through spraying or similar surface deposition techniques, metal nanoparticle agglomerates may be located predominantly upon the surface of the protective covering. In the case of textile fibers, for example, metal nanoparticle agglomerates may extend to a depth of about 3-4 fiber layers when deposited thereon according to the disclosure herein. The predominant surface coating ensures efficient use of the metal nanoparticle agglomerates compared to dip coating processes, wherein metal nanoparticles or their agglomerates may be deposited throughout predominantly all of the fiber layers. Metal nanoparticles or agglomerates thereof buried within deeper fiber layers may be ineffective or less effective for conveying antiseptic activity once applied to a surface, such as a touch surface. In the case of a mask or similar facial covering, it may also be desirable for metal nanoparticle agglomerates to also be located in deeper layers of the mask or facial covering, or a protective covering therefor, since breathing air passing through the mask, facial covering or protective covering may interact continually with the metal nanoparticle agglomerates therein. Similar to a depth filter, a longer contact pathway for breathing air may afford more effective pathogen control.

The base substrates of the protective coverings disclosed herein may have an optional adhesive (e.g., a contact adhesive) upon a surface opposite that where metal nanoparticles agglomerates are deposited and adhered. Both conformal and non-conformal protective coverings may include a contact adhesive in this location. The contact adhesive may be located upon a surface of the base substrate for facilitating attachment of the protective coverings to a touch surface, such as upon a wall. For example, metal nanoparticle agglomerates may be adhered to a first side of the base substrate (i.e., a face of the base substrate facing away from a touch surface) and a second side of the base substrate may be adapted to contact the touch surface, wherein the contact adhesive may be located upon the second side of the base substrate and facilitate adhesion to the touch surface. Optionally, metal nanoparticles or metal nanoparticle agglomerates may also be incorporated upon the second side of the base substrate that contacts the touch surface, wherein the metal nanoparticles or metal nanoparticle agglomerates upon the second side of the base substrate may begin to control pathogens contaminating the surface and/or facilitate disinfection once the protective covering is removed. Metal nanoparticle agglomerates on the surface of the base substrate facing outward, in contrast, may aid in inactivating new pathogens that become deposited thereon. When metal nanoparticles or metal nanoparticle agglomerates are present upon the side of the base substrate configured to contact a touch surface, the metal nanoparticles or metal nanoparticle agglomerates may be sprayed upon the surface, sprayed upon the contact adhesive (if present), or mixed within the formulation for the contact adhesive (if present). Suitable contact adhesives are not considered to be particularly limited and may be selected based upon the type of touch surface to be contacted by the protective coverings.

In some embodiments, the protective coverings may be attached to a surface subject to infection using a mechanical connector. Mechanical connectors that may be used to adhere the protective coatings to a surface, mask or similar facial covering may include, but are not limited to, buttons (e.g., flat buttons, hook and eye connectors, click buttons, brads, or the like), needles, VELCRO, straps (elastic or non-elastic), snaps, tape or the like. In many instances, a complementary structure for mating with a mechanical connector may be located upon a surface, mask or similar facial covering to facilitate attachment of the protective covering thereto. For example, a button upon the protective covering may mate with a complementary structure such as a buttonhole, eye hook, snap, loop, or like structure upon the surface, mask or similar facial covering. Alternately, the button or similar structure may be located upon the surface, mask or facial covering, and the complementary structure may be located upon the protective covering. Suitable buttons or similar mechanical connectors may be formed from metal, plastic, or any combination thereof. Some types of mechanical connectors may be configured such that the protective covering may slide over a surface, mask or facial covering and be tensioned in place, such as with an elastic band or fabric band.

Instead of an adhesive or mechanical connector for promoting attachment to a surface subject to infection, the protective coverings may also be complementary to the surface subject to infection itself. In this regard,protective coverings of the present disclosure may also be tubular in form (e.g., like a sock or similar annular structure) and be configured to slide over a surface, mask or facial covering subject to infection. In the case of a protective covering that is tubular in form and configured for attachment to a mask or facial covering, the outer surface of the tubular form may be coated with metal nanoparticle agglomerates, or only a portion of the tubular form may be coated with metal nanoparticle agglomerates. For example, the portion of a tubular form contacted directly by a wearer's breath on the inner surface of a mask or facial covering may lack metal nanoparticle agglomerates. The protective coverings may also simply wrap around a surface subject to infection, much like athletic tape or similar wrapping materials.

The loading of metal nanoparticles upon the base substrate may include a coverage density ranging from about 0.03 mg/in$^2$ to about 10 mg/in$^2$, or about 0.5 mg/in$^2$ to about 5 mg/in$^2$, or about 1 mg/in$^2$ to about 3 mg/in$^2$, or about 0.03 mg/in$^2$ to about 0.1 mg/in$^2$, or about 0.1 mg/in$^2$ to about 0.7 mg/in$^2$, or about 0.7 mg/in$^2$ to about 1.5 mg/in$^2$, or about 1.5 mg/in$^2$ to about 2 mg/in$^2$, or about 2 mg/in$^2$ to about 3 mg/in$^2$, or about 3 mg/in$^2$ to about 10 mg/in$^2$, or about 0.4 mg/in$^2$ to about 5 mg/in$^2$, or about 0.5 mg/in$^2$ to about 3 mg/in$^2$ Loadings of metal nanoparticle agglomerates within these ranges may be accomplished by spraying a spray formulation, dip-coating, painting, or the like. To achieve the loadings in the above range, the coverage of metal nanoparticle agglomerates upon the base substrate may range from about 5% to about 95% by area, or about 50% to about 99% by area, or about 60% to 95% by area. Areal coverage may refer to the extent of coverage upon individual fibers of a fibrous base substrate or upon a base substrate as a whole. Even coverage densities as low as 3-5% by area may be effective for promoting disinfection in the disclosure herein. When disposed upon a fabric, the metal nanoparticle agglomerates may be present upon the surface of the fabric and optionally penetrate about 2 to about 5 fabric layers below the surface.

When present at the foregoing coverages and coverage densities upon either side of the base substrate, the metal nanoparticle agglomerates may inactivate various pathogens, oftentimes more effectively than does a bulk metal surface comprising the same metal. For example, copper nanoparticle agglomerates adhered to a base substrate and retaining their nanoparticulate form may inactivate/kill viruses in as little as 5-10 seconds. Even dry wipes containing metal nanoparticle agglomerates may be effective for inactivating viruses within this timeframe. Up to 100% kill rates or inactivation rates may be realized. Bulk copper surfaces, in contrast, may take several hours to reach the same level of inactivation. As such, protective coverings made in accordance with the disclosure herein may convey antiseptic activity to a surface not having antiseptic activity and/or the antiseptic activity of a surface may be enhanced. Alternately, the protective coverings may cover an underlying pathogen that might otherwise be spread from a touch surface. In the case of masks and similar facial coverings, the combination of a protective covering and the mask/facial covering may afford more effective protection against various pathogens than can the mask or facial covering alone.

Accordingly, protective coverings of the present disclosure may comprise a base substrate, and metal nanoparticles agglomerates adhered to the base substrate, wherein the base substrate is adapted for attachment to a surface subject to infection, such as a touch surface, mask or similar facial covering. Metal nanoparticle agglomerates may be adhered to a first side of the base substrate and optionally a second side of the base substrate, wherein the second side of the base substrate is adapted to contact the surface subject to infection. Further optionally, an adhesive, such as a contact adhesive, may be located upon the second side of the base substrate to facilitate attachment to a surface.

In more specific examples, the protective coverings may comprise a fabric comprising a plurality of fibers, and metal nanoparticle agglomerates adhered to the fibers. Metal nanoparticle agglomerates may be adhered to a first side of the fabric, optionally penetrating up to about 2-5 fabric layers deep, and optionally upon a second side of the fabric. Further optionally, an adhesive, such as a contact adhesive, or a mechanical connector may be located upon the second side of the fabric to facilitate attachment to a surface, mask or similar facial covering.

The base substrate may comprise a material selected from a polymer, a textile, paper, cardboard, and any combination thereof. The base substrate may be in a form of a fabric, tape, sheet, film, VELCRO, or any combination thereof.

The metal nanoparticle agglomerates may comprise copper nanoparticles, silver nanoparticles, or any combination thereof. Copper nanoparticles in an amount effective to control infection (e.g., a minimum coverage of about 60% to about 95% of the base substrate by area and/or a minimum coverage density of about 0.5 mg/in$^2$ to about 5 mg/in$^2$ or about 1 mg/ins to about 2 mg/in$^2$) may be especially efficacious for mitigating infection spread from bacteria and viruses. Without being bound by any theory or mechanism, it is believed that Cu(0) may be oxidized to Cu(I) on the base substrate in a slow process, with further oxidation to Cu(II) taking place rapidly thereafter. When contacting a pathogen, such as bacteria or viruses, hydroxyl radicals and lipid radicals may form, which may disrupt the outer lipid bilayer or protein shell of a virus or bacterium. In addition, copper may bind to heteroatoms (e.g., S, N or P) within amino acids, proteins, DNA and/or RNA of viruses, bacteria and other pathogens to result in inactivation. Metal penetration within a cell membrane or protein coat may also occur, wherein the metal may inhibit DNA/RNA replication and/or inhibit protein transport.

Combinations of copper nanoparticles and silver nanoparticles may afford particular synergy against pathogens not remediated adequately with a single metal alone. That is, copper nanoparticles and silver nanoparticles may convey biocidal activity against different pathogens. In addition, enhanced activity against a particular pathogen may be realized when both copper nanoparticles and silver nanoparticles are present, as compared to copper nanoparticles or silver nanoparticles alone. Copper may be desirable in some instances due to its lower cost and potential for lower toxicity compared to silver.

The protective coverings of the present disclosure may be formed by spraying metal nanoparticle agglomerates upon a base substrate using a suitable spray formulation. More specifically, such methods may comprise providing a base substrate configured for attachment to a surface subject to infection, and depositing a plurality of metal nanoparticle agglomerates upon the base substrate such that the metal nanoparticle agglomerates become adhered thereto, and the metal nanoparticle agglomerates are present in an amount and coverage density upon the base substrate to provide infection control, wherein the metal nanoparticle agglomerates are deposited upon the base substrate using a spray formulation comprising an aerosolizable fluid medium and metal nanoparticle agglomerates dispersed in the aerosolizable fluid medium. The metal nanoparticles may become adhered to the base substrate after being deposited thereon or become adhered at a later time. The metal nanoparticle agglomerates may retain individual metal nanoparticles after becoming adhered to the base substrate, or the metal nanoparticles may become at least partially fused to one another after becoming adhered. Adhesion of the metal nanoparticle agglomerates to the base substrate may be promoted by an adhesive or adhesion may occur directly to the base substrate upon at least partial loss of one or more surfactants from the metal nanoparticles.

Spray formulations suitable for applying metal nanoparticle agglomerates to a base substrate may comprise an aerosolizable fluid medium, and a plurality of metal nanoparticle agglomerates dispersed in the aerosolizable fluid medium. The aerosolizable fluid medium may be an aerosol propellant (optionally including an organic solvent) or a volatile organic solvent, depending on whether the spray formulations will be sprayed via pumping or gas-pressurization, or dispensed from an aerosol spray vessel, such as an aerosol spray can. Aerosol spray cans may be particularly desirable, since they are in wide use and are easily manufactured and shipped. Thus, aerosol spray formulations containing metal nanoparticle agglomerates may be particularly advantageous. Aerosol propellants may afford sprayed droplet sizes ranging from about 10-150 microns, whereas mechanically pumped or gas-pressurized sprays may have a larger droplet size in a range of about 150-400 microns.

Spray formulations comprising metal nanoparticle agglomerates, such as silver nanoparticles and/or copper nanoparticles and their agglomerates, may be prepared by dispersing as-produced or as-isolated metal nanoparticles in an organic matrix containing one or more organic solvents or other liquid medium in which the metal nanoparticle agglomerates may be admixed as a well-dispersed solid. Optionally, the aerosolizable fluid medium may comprise one or more inorganic components as well, particularly water. Spray formulations refer to both mechanically pumped and forced sprays and sprays dispensed through use of an aerosol propellant. Pumped and forced sprays may be dispensed through gas pressurization, and/or through pressurization with a mechanical or pneumatic pump. An aerosol propellant may be present in a vessel housing an organic matrix containing dispersed metal nanoparticle agglomerates for spray formulations not intended for dispensation via pumping or gas pressurization. Spray formulations containing an aerosol propellant may be stored in a pressurized state, such that the spray formulation may dispensed simply by activating a release or actuator upon a vessel housing the spray formulation.

Particularly suitable organic solvents that may be present in spray formulations suitable for dispensation by pumping or gas-pressurization, or in combination with an aerosol propellant, include one or more alcohols and optionally water. Suitable alcohols include a $C_1$-$C_{11}$ alcohol, or multiple $C_1$-$C_{11}$ alcohols in any combination. Additional alcohol-miscible organic solvents may also be present. Ketone and aldehyde organic solvents, also in the $C_1$-$C_{11}$ size range, may also be used, either alone or in combination with one or more alcohols. Ketone and aldehyde solvents are less polar than are alcohols and may aid in promoting dispersion of metal nanoparticle agglomerates. Low boiling ethers such as diethyl ether, dipropyl ether, and diisopropyl ether, for example, may also be suitably used to promote metal nanoparticle dispersion. One or more glycol ethers (e.g., diethylene glycol, triethylene glycol, or the like), alkanolamines (e.g., ethanolamine, triethanolamine, or the like), or any combination thereof may also be used alone or in combination with one or more alcohols or any of the other foregoing organic solvents. Various glymes may also be used similarly. Water-miscible organic solvents and mixtures of water and water-miscible organic solvents may be used as well, such as water-organic solvent mixtures comprising up to about 50% water by volume, or up to about 75% water by volume, or up to about 90% water by volume. The organic solvent(s) may be removed either before or after the surfactant coating is lost in the course of promoting adherence of the metal nanoparticles to a surface.

Any of the foregoing organic solvents or mixtures thereof, including water-organic solvent mixtures, may also be utilized to disperse metal nanoparticles or agglomerates thereof as a concentrate for combination with an aerosol propellant.

In particular examples, the spray formulations can contain one or more alcohols, which may be $C_1$-$C_{11}$, $C_1$-$C_4$, $C_4$-$C_{11}$ or $C_7$-$C_{11}$ in more particular embodiments. $C_1$-$C_4$ alcohols may be particularly desirable due to their lower boiling points, which may facilitate solvent removal following dispensation. In various embodiments, the alcohols can include any of monohydric alcohols, diols, or triols. One or more glycol ethers (e.g., diethylene glycol and triethylene glycol), alkanolamines (e.g., ethanolamine, triethanolamine, and the like), or any combination thereof may be present in certain embodiments, which may be present alone or in combination with other alcohols. Various glymes may be present with the one or more alcohols in some embodiments.

Spray formulations suitable for dispensation by pumping or forced pressurization with a gas may exhibit a viscosity value of about 1 cP to about 500 cP, including about 1 cP to about 100 cP. Low viscosity values such as these may facilitate dispensation through spraying promoted by mechanical pumping or forced pressurization. Metal nanoparticle loadings within the spray formulations to produce the foregoing viscosity values may range from about 1 wt. % to about 35 wt. %, or about 5 wt. % to about 35 wt. %, or about 10 wt. % to about 25 wt. %, or about 8 wt. % to about 25 wt. %, or about 1 wt. % to about 8 wt. %. Liquid dispersions suitable for painting/brushing or dip coating may contain metal nanoparticle agglomerates in similar concentration ranges.

Spray formulations comprising an aerosol propellant may also be suitable for use in the disclosure herein. Such spray formulations may similarly comprise metal nanoparticles or agglomerates thereof dispersed in a fluid medium comprising at least an aerosol propellant and optionally other solvents to promote metal nanoparticle dispersion therein. Aerosol propellants may afford sprayed droplets ranging from about 10-150 microns in size.

Any conventional aerosol propellant may be utilized in the spray formulations, provided that the metal nanoparticle agglomerates can be effectively dispersed therein, optionally in combination with one or more additional solvents, and ejected from a spray can or similar pressure vessel. Organic and/or inorganic aerosol propellants may be used. Suitable inorganic aerosol propellants may include, for example, nitrous oxide or carbon dioxide. Suitable organic aerosol propellants may include, for example, volatile hydrocarbons (e.g., ethane, propane, butane, or isobutane), dimethyl ether, ethyl methyl ether, hydrofluorocarbons, hydrofluoroolefins, or any combination thereof. Chlorofluorocarbons and similar compounds may also be used as an aerosol propellant, but their use is not preferred due to their ozone-depleting properties. Nevertheless, chlorofluorocarbons may be satisfactory alternatives in situations where other organic aerosolizable fluid media may not be effectively used.

When using an aerosol propellant to promote dispensation of metal nanoparticle agglomerates, the metal nanoparticle agglomerates may be directly combined therewith, or the metal nanoparticles may be dissolved in a secondary fluid medium that is subsequently combined with the aerosol propellant in a spray can or similar pressure vessel. Suitable secondary fluid media may comprise organic solvents such as alcohols, glycols, ethers, or the like. Any of the organic solvents utilized above in mechanically pumped or forced-pressurization spray formulations may be incorporated in spray formulations containing an aerosol propellant as a secondary fluid medium as well.

Spray formulations comprising an organic solvent may comprise a mixture of organic solvents that evaporates in a specified period of time, typically under ambient conditions. In non-limiting examples, evaporation may take place in about 1 minute or less, or about 2 minutes or less, or about 5 minutes or less, or about 10 minutes or less, or about 15 minutes or less, or about 30 minutes or less. To facilitate evaporation, the metal nanoparticle agglomerates may be dispersed as a concentrate in a higher boiling organic solvent, such as a $C_{10}$ alcohol, which is then combined with a much larger quantity of low boiling organic solvent, such as ethanol or diethyl ether, optionally in further combination with additional organic solvents. The high boiling organic solvent may be sufficiently hydrophobic to facilitate dispersion of the metal nanoparticles in the less hydrophobic and lower boiling organic solvent comprising the majority of the organic phase. Since the high boiling organic solvent is present in only small quantities, it does not adversely impact the evaporation time to a significant degree.

Spray formulations containing an aerosol propellant may be loaded in a spray vessel comprising a body, a valve and an actuator for the valve. Suitable spray vessels include, for example, disposable spray cans and similar pressure vessels, which will be familiar to persons having ordinary skill in the art.

Spray formulations dispersed in one or more organic solvents but lacking an aerosol propellant may be loaded in a spray vessel featuring a pump and/or a gas pressurization line for ejecting the spray formulation via a suitably configured outlet to promote droplet formation. Suitable spray vessels may be manually pumped, pressurized with a gas (e.g., an inert gas or air), or coupled to a mechanical or pneumatic pump.

The metal nanoparticles used in the spray formulations can be about 20 nm or more in size, particularly about 50 nm or more in size. In particularly suitable examples, all or at least about 90%, at least about 95%, or at least about 99% of the metal nanoparticles within the metal nanoparticle agglomerates may be about 20 nm to about 200 nm in size or about 50 nm to about 250 nm in size. Smaller copper nanoparticles (under 20 nm), for example, may tend to undergo more extensive oxidation into CuO or Cu$_2$O, including partial or complete oxidation into these compounds, than do larger copper nanoparticles having a size above 20 nm. In the presence of moisture, formation of other salt compounds may be more prevalent for smaller copper nanoparticles like these. Copper nanoparticles in the foregoing size range (20 nm or above) may afford a mixture of CuO or Cu$_2$O, or a copper salt depending on use conditions, upon a metallic copper metal core, the combination of which may be advantageous for inactivating pathogens upon a surface once applied thereto in the form of a protective covering. Silver nanoparticles in a similar size range may form an advantageous silver oxide coating upon a metallic silver core when processed according to the disclosure herein to promote adherence to a surface. When the copper nanoparticles and/or silver nanoparticles are agglomerated together upon a surface, the oxide coating may extend over at least a portion of the surface of the agglomerate, leaving an exposed copper or silver metal surface below within the porosity of the agglomerate. The oxide(s) in combination with unconverted metal may offer complementary biocidal activity for promoting disinfection according to the disclosure herein. By having larger metal nanoparticles in the foregoing size range, a substantial amount of zero-valent metal may be retained for promoting biocidal activity in combination with at least some oxide, whereas smaller metal nanoparticles may form too much oxide to promote optimal biocidal activity.

Metal nanoparticle agglomerate loadings upon a base substrate may range from about 0.5 wt. % to about 5 wt. % based on total weight. The loading of metal nanoparticle agglomerates upon a surface through deposition of a spray formulation may include a coverage density ranging from about 0.1 mg/in$^2$ to about 10 mg/in$^2$, or about 0.5 mg/in$^2$ to about 5 mg/in$^2$, or about 1 mg/in$^2$ to about 2 mg/in$^2$ or about 0.5 mg/in$^2$ to about 3 mg/in$^2$, or about 0.4 mg/in$^2$ to about 5 mg/in$^2$, or about 0.5 mg/in$^2$ to about 3 mg/in$^2$ The coverage of metal nanoparticle agglomerates upon the surface may range from about 5% to about 95% by area, or about 50% to about 99% by area, or about 60% to 95% by area. Even agglomerate coverage densities as low as 3-5% by area may be effective for promoting biocidal activity in the disclosure herein due to the mobility of individual metal nanoparticles or small metal nanoparticle agglomerates shed from adhered, larger metal nanoparticle agglomerates. When present at the foregoing coverages and coverage densities, the metal nanoparticles released from the metal nanoparticle agglomerates may effectively inactivate various pathogens, including certain bacteria and viruses, oftentimes more effectively than does a bulk metal surface comprising the same metal. For example, copper nanoparticles adhered to a surface and retaining their nanoparticulate form within a plurality of nanoparticle agglomerates may inactivate/kill viruses in as little as 30 seconds. Up to 100% kill rates or inactivation rates may be realized in such a short time. Bulk copper surfaces, in contrast, may take several hours to reach the same level of inactivation. Bacteria may undergo similar levels of inactivation or killing in various instances.

Copper nanoparticles that are about 20 nm or less in size can also be used in embodiments disclosed herein. Copper nanoparticles in this size range have a fusion temperature of about 220° C. or below (e.g., a fusion temperature in the range of about 140° C. to about 220° C.) or about 200° C. or below, or even about 175° C. or below, which can provide advantages noted above. Silver nanoparticles about 20 nm or less in size may similarly exhibit a fusion temperature differing significantly from that of the corresponding bulk metal. Larger metal nanoparticles (either copper or silver nanoparticles), in turn, have a higher fusion temperature, which may rapidly increase and approach that of bulk metal as the nanoparticle size continues to increase. Depending on the processing temperature and the fusion temperature of the copper nanoparticles and/or silver nanoparticles based upon their size, the metal nanoparticles may or may not be fused upon a base substrate when deposited thereon (e.g., by spraying) according to the disclosure herein. Regardless of whether the metal nanoparticles become fused or not once deposited upon a base substrate, after the surfactant coating is removed, the copper nanoparticles and/or silver nanoparticles may experience robust adherence to the base substrate and become effective for promoting infection control.

As-produced copper nanoparticles and silver nanoparticles are usually produced in the form of agglomerates which need to be broken apart into individual surfactant-coated metal nanoparticles in order to promote use in various applications. Surprisingly, as-produced agglomerates, such as those residing in a 0.5-5 micron size range (500 nm-5 micron size range) or a 3-5 micron size range, can be effective for spray dispensation and retention upon a surface. Agglomerates of these sizes, and even larger, may be more effectively retained upon a base substrate than are individual metal nanoparticles or smaller agglomerates. Within the agglomerates, recognizable sub-structures may be present prior to nanoparticle fusion such as, but not limited to, 10-50 nm thick platelets, 100-250 nm wide spheres, metal nanowires, the like, or any combination thereof. Copper nanoparticles and/or silver nanoparticles may also be combined with pre-made nanowires (e.g., copper nanowires or silver nanowires) in a suitable spray formulation for deposition upon a surface as well.

In addition to copper nanoparticles, silver nanoparticles, or alternative nanostructures, other additives may be incorporated in the disclosure herein. Suitable additives may include, but are not limited to, those capable of producing reactive oxygen species (ROS), which may cause lipid, protein, or DNA damage in microorganisms, eventually leading to cell membrane damage and cell death. These additives may complement or enhance the biocidal activity conveyed by copper nanoparticles, silver nanoparticles, or alternative metal nanoparticles having biocidal activity, such as those comprising zinc, nickel, titanium, and/or their oxide forms. Conventional disinfectant compounds may be present upon protective coverings of the present disclosure as well, examples of which will be familiar to one having ordinary skill in the art.

NiO may be included as an additive in addition to metal nanoparticles within metal nanoparticle agglomerates. NiO is very efficient in producing ROS when present in small concentrations. NiO may be effective when included at, for example, about 0.5% to about 10% of the load of copper nanoparticles and/or silver nanoparticles in the spray formulations (e.g., 0.1 mg, 0.2 mg, or 0.5 mg to 100 mg NiO) as sub-micron particles separate and distinct from the copper nanoparticles and/or silver nanoparticles. At these loadings, NiO is very effective against certain bacteria, which may broaden the biocidal effectiveness of copper or silver. Bismuth, zinc, and tin oxides may be similarly effective at loadings of about 0.5% to about 10% of the mass of copper nanoparticles.

$TiO_2$ may be included in addition to metal nanoparticles located within metal nanoparticle agglomerates. $TiO_2$ may catalyze the formation of hydroxyl radicals upon UV irradiation (e.g., in sunlight) when a protective covering of the present disclosure is located outdoors, for example. Atmospheric moisture may supply the source of water for producing the hydroxyl radicals by photooxidation. $TiO_2$ may be present at about 1% to about 25% of the load of copper nanoparticles and/or silver nanoparticles when deposited upon a protective covering of the present disclosure. The $TiO_2$ may likewise be present in the form of nanoparticles and/or micron-size particles (e.g., about 100 nm to about 5 microns).

Copper nanoparticles and/or silver nanoparticles, ZnO, NiO and/or $TiO_2$ may also be used in any combination with one another upon the protective coverings as well.

As discussed above, metal nanoparticle agglomerates may exhibit adherence to a variety of surfaces, such as through van der Waals adhesion and electrostatic interactions, which may be further supplemented through the high surface energy of the metal nanoparticles. In addition to metal nanoparticles, an adhesive may further promote metal nanoparticle agglomerate adherence to a given surface. That is, the base substrate may also have an adhesive upon a face of the base substrate opposite that contacting a surface. The adhesive may be present in a spray formulation depositing the metal nanoparticle agglomerates, or an adhesive may be deposited separately. Both a contact adhesive contacting the touch surface or mask and a non-contact adhesive on a face of the base substrate opposite the touch surface or mask may be present. The non-contact adhesive may promote metal nanoparticle agglomerate adherence to the base substrate. Suitable adhesives for promoting metal nanoparticle agglomerate adherence may include, for example, conventional epoxy adhesives, nitrile rubber adhesives, acrylic adhesives, styrene-acrylic adhesives, cyanoacrylate adhesives, solvent-based adhesives, aqueous emulsions, and the like. Particularly suitable adhesives may be biologically compatible adhesives such as octyl cyanoacrylate, 2-octyl cyanoacrylate, butyl cyanoacrylate, and isobutyl cyanoacrylate. Other examples of suitable adhesives having biocompatibility include, for example, polydioxanone, polyglycolic acid, polylactic acid, and polyglyconate. MAXON, a polyglycolide-trimethylene carbonate used a biodegradable suture adhesive, may represent a particular example. The adhesive may be present in a spray formulation in an amount sufficient to promote uniform application upon a surface, such as at a loading of 0.1 mg/in$^2$ to about 0.5 mg/in$^2$. Suitable loadings of the adhesive in the spray formulations may range from about 0.35 g adhesive/100 g spray formulation to about 2.75 g adhesive/100 g spray formulation. Coverage of the adhesive upon the face of the base substrate opposite the touch surface may range from about 50% to about 100% by area, or about 60% to about 90% by area, or about 75% to about 95% by area, or about 90% to about 99% by area. A layer thickness of the adhesive upon the face of the base substrate opposite the touch surface or mask may be about 50 nm or less, such as about 1 nm to about 2 nm, or about 2 nm to about 5 nm, or about 5 nm to about 10 nm. In addition to promoting surface adherence of metal nanoparticle agglomerates, the adhesive may slow down the production of oxidized metal species, thereby affording a time-release activity profile of individual or small agglomerates of metal nanoparticles or various oxidized forms thereof.

When applying an adhesive to the surface of a base substrate by spraying upon a base substrate surface opposite a touch surface, the adhesive may be present in the spray formulation applied to the base substrate, or an adhesive formulation and a spray formulation comprising metal nanoparticle agglomerates may be sprayed separately. The adhesive formulation may be sprayed upon the base substrate first, followed by the spray formulation comprising metal nanoparticle agglomerates, or the adhesive formulation and the metal nanoparticle agglomerates may be sprayed concurrently. When used, the adhesive may further facilitate time-release of metal nanoparticles from the metal nanoparticle agglomerates.

After depositing metal nanoparticle agglomerates upon a base substrate, the coverage of metal nanoparticle agglomerates upon the surface of the base substrate may range from about 5% to about 75% by area or other suitable ranges disclosed herein. Thereafter, removal of the solvent and optionally surfactants may take place, either at room temperature and atmospheric pressure, or with heating and optional application of vacuum (reduced pressure). Solvent evaporation may take place in conjunction with metal nanoparticle agglomerate deposition if the aerosolizable fluid medium is sufficiently volatile. Alternately, the aerosolizable fluid medium may be removed after metal nanoparticle agglomerate deposition takes place. If tolerable to the base substrate, nanoparticle fusion (if occurring) and/or solvent removal may be accelerated by one or more of heating and application of vacuum. Heating may take place at any temperature from room temperature up to or beyond the fusion temperature of the metal nanoparticles, provided that the heating temperature is not so high that the base substrate experiences thermal damage. Thus, the metal nanoparticles may be fused or unfused when adhered to a base substrate. Moreover, the heating temperature need not necessarily exceed the normal boiling point or reduced pressure boiling point of the surfactants and solvent in order to promote their removal. Gentle heating well below the boiling point of the surfactant and solvent may be sufficient to promote their removal in many instances. In non-limiting embodiments, heating may be conducted under flowing nitrogen or air or under vacuum to promote solvent and/or surfactant removal. Room temperature removal of organic solvents and/or surfactants may also be conducted. For example, heating may take place at a temperature of about 35° C. to about 65° C. in flowing nitrogen or air to promote removal of solvent and surfactant, thereby leaving unfused metal nanoparticles distributed upon the base substrate as a plurality of adhered metal nanoparticle agglomerates. Additional heating may be conducted thereafter, if desired, to promote metal nanoparticle fusion. In either case, after the surfactants are removed from the nanoparticle surface, robust adherence to the base substrate may be realized. When heating under higher temperatures, use of an inert atmosphere, such as nitrogen, may be desirable to limit degradation of a substrate and to control the amount of surface oxidation taking place upon the metal nanoparticles.

Once the surfactant has been removed from the metal nanoparticles (e.g., copper nanoparticles and/or silver nanoparticles in metal nanoparticle agglomerates), the metal nanoparticles may undergo at least partial oxidation to form an oxide coating. The size of copper nanoparticles or agglomerates thereof may be selected such that at least some copper metal remains following oxidation, since a mixture of copper metal and oxidized copper may be beneficial for conveying antiseptic activity by inactivating one or more pathogens. Silver nanoparticles may similarly experience different amounts of surface oxidation depending upon the size of the silver nanoparticles and how they are processed. In non-limiting embodiments, following surfactant removal, copper nanoparticles may form a reaction product comprising about 25% to about 99% metallic copper by weight, about 0.5% to about 60% $Cu_2O$ by weight, and about 0.1% to about 20% CuO by weight. In more particular embodiments, the amount of metallic copper may be about 45% to about 90% by weight, or about 50% to about 70% by weight, or about 80% to about 98% by weight, and the amount of $Cu_2O$ may about 10% by weight or less, such as about 0.1% to about 10% by weight or less or about 5% to about 10% by weight or less, and the amount of CuO may be about 1% by weight or less, such as about 0.1% to about 1% by weight or about 0.5% to about 1% by weight. The $Cu_2O$ and CuO may form a shell or partial shell upon the metal nanoparticles or agglomerates thereof that is about 1 nm or greater, or about 10 nm or greater in thickness, or even about 100 nm or greater in thickness, such as about 10 nm to about 100 nm thick in many instances.

Silver nanoparticles adhered to the base substrate may similarly comprise about 25% to about 99% metallic silver by weight and the balance being $Ag_2O$. The $Ag_2O$ may similarly be present in a shell having a thickness of about 10 nm or greater, such as about 100 nm to about 3 microns thick.

Methods for promoting infection control may comprise: providing a protective covering of the present disclosure, and applying the protective covering to a surface subject to infection, such as a touch surface, mask or similar facial covering. The surface to be covered with the protective covering may already have been deployed in its native environment and may or may not have been infected with one or more pathogens. The surface may have already been disinfected with metal nanoparticles or another disinfection method, or the surface may not have been previously disinfected. The surface may have been previously impregnated with metal nanoparticles during manufacturing thereof. As the protective covering wears out and is no longer providing effective infection control, it may be replaced, or a surface covered with the protective covering may itself undergo disinfection to alleviate its infection burden. After having a protective covering applied thereto, surfaces may have antiseptic activity conveyed thereto for at least about one day (8-12 hours), or at least about 2 days, or at least about 3 days, or at least about 4 days, or at least about 5 days, or at least about 6 days, or at least about 7 days, or at least about 10 days, or at least about 14 days, or at least about 21 days, or at least about 30 days.

Dry wipes impregnated with metal nanoparticle agglomerates may contain similar loadings and coverage densities upon a wipe material, which may comprise a cellulosic or textile fabric in particular instances. Dry wipes may be packaged under conditions that limit substantial oxidation of metal nanoparticle agglomerates prior to dispensation of a dry wipe for use thereof. Pathogens introduced to touch surfaces and similar surfaces subject to infection may similarly be remediated or addressed using dry wipes in a like manner to that described above for the protective coverings described herein.

Embodiments disclosed herein include:

A. Protective coverings. The protective coverings comprise: a base substrate; and metal nanoparticles or agglomerates thereof adhered to the base substrate; wherein the base substrate is configured for attachment to a touch surface subject to infection.

B. Methods for forming a protective covering. The methods comprise: providing a base substrate configured for attachment to a touch surface subject to infection; and depositing metal nanoparticles or agglomerates thereof upon the base substrate in an effective amount to provide antiseptic activity; wherein the metal nanoparticles are deposited with a spray formulation comprising an aerosolizable fluid medium and metal nanoparticles dispersed in the aerosolizable fluid medium.

C. Methods for protecting a touch surface. The methods comprise: providing a protective covering comprising a base substrate and metal nanoparticles or agglomerates thereof adhered to the base substrate; wherein the metal nanoparticles are present upon the base substrate in an amount and a coverage effective to promote infection control; and applying the protective covering to a touch surface subject to infection.

Each of embodiments A-C may have one or more of the following additional elements in any combination:

Element 1: wherein the base substrate comprises a material selected from the group consisting of a polymer, a textile, paper, cardboard, or any combination thereof.

Element 2: wherein the base substrate is in a form of a fabric, tape, sheet, VELCRO, or any combination thereof.

Element 3: wherein the metal nanoparticles comprise copper nanoparticles, silver nanoparticles, or any combination thereof.

Element 4: wherein the metal nanoparticles are adhered to a first side of the base substrate and a second side of the base substrate is adapted to contact the touch surface.

Element 4A: wherein the protective covering further comprises an adhesive located on the first side of the base substrate.

Element 5: wherein the protective covering further comprises a contact adhesive located upon the second side of the base substrate.

Element 6: wherein the protective covering further comprises metal nanoparticles located upon the second side of the base substrate.

Element 7: wherein the metal nanoparticles on the second side of the base substrate are admixed with the contact adhesive.

Element 8: wherein the metal nanoparticles cover about 5% to about 95% of the base substrate by area and at a coverage of about 1 $mg/in^2$ to about 2 $mg/in^2$.

Element 9: wherein the metal nanoparticles are applied to a first side of the base substrate.

Element 10: wherein the method further comprises applying an adhesive to the first side of the base substrate.

Element 11: wherein the method further comprises applying a contact adhesive to a second side of the base substrate; and optionally applying metal nanoparticles to the second side of the base substrate.

Element 12: wherein the aerosolizable fluid medium comprises an aerosol propellant.

By way of non-limiting example, exemplary combinations applicable to A-C include, but are not limited to: 1 and 2; 1 and 3; 1 and 4; 1, 4 and 4A, 1 and 5; 1, 5 and 6; 1 and 6, 1, 4, 6 and 7; 1 and 8; 2 and 3; 2 and 4; 2, 4 and 4A; 2 and 5; 2, 5 and 6; 2 and 6; 2, 4, 6 and 7; 2, 4, 4A, 6 and 7; 2 and 8; 3 and 4; 3, 4 and 4A; 3 and 5; 3, 5 and 6; 3 and 6; 3, 4, 6 and 7; 3, 4, 4A, 6 and 7; 3 and 8; 4 and 5; 4, 4A and 5; 4, 5 and 6; 4, 4A, 5 and 6; 4, 6 and 7; 4, 4A, 6 and 7; 4 and 8; and 4, 4A and 8. Any of 1, 2, 3, 4, 4A, 5, 6, 7 or 8 may be in combination with 9, 10, 11 or 12.

Additional embodiments disclosed herein include:

AA. Protective coverings. The protective coverings comprise: a fabric comprising a plurality of fibers; and metal nanoparticles or agglomerates thereof adhered to the plurality of fibers; wherein the fabric is configured for attachment to a mask or facial covering subject to infection.

AA1. A mask or facial covering having the protective covering A adhered thereto.

BB. Methods for protecting a mask or facial covering. The methods comprise: providing a protective covering comprising a fabric and metal nanoparticles or agglomerates thereof adhered to a plurality of fibers comprising the fabric; wherein the metal nanoparticles are present upon the fabric in an amount and a coverage effective to promote infection control; and applying the protective covering to a mask or facial covering subject to infection.

Each of embodiments AA/AA1 and BB may have one or more of the following additional elements in any combination:

Element 1': wherein fabric comprises polymer fibers, natural fibers, cotton fibers, cellulosic fibers, or any combination thereof.

Element 2': wherein the metal nanoparticles are present upon a face of the fabric opposite a face contacting the mask or facial covering.

Element 3': wherein the protective covering further comprises a contact adhesive present upon the face contacting the mask or facial covering.

Element 4': wherein the protective covering further comprises a mechanical connector upon the face contacting the mask or facial covering.

Element 4A': wherein the mechanical connector is a fabric band, a fabric tube, or an elastic band.

Element 5': wherein the metal nanoparticles comprise copper nanoparticles, silver nanoparticles, or any combination thereof.

Element 6': wherein the metal nanoparticles are at least partially adhered to the fibers with an adhesive.

Element 7': wherein the metal nanoparticles cover about 5% to about 95% of the fabric by area and at a coverage of about 0.5 mg/in$^2$ to about 3 mg/in$^2$.

Element 8': wherein the fabric is pleated and comprises overlapping pleated layers.

Element 9': wherein the fabric is unpleated.

By way of non-limiting example, exemplary combinations applicable to AA/AA1 and BB include, but are not limited to: 1' and 2'; 1', and 3' or 4'/4A'; 1' and 5'; 1' and 6'; 1' and 7'; 1', and 8' or 9'; 2', and 3' or 474A'; 2' and 5'; 2' and 6'; 2' and 7'; 2', and 8' or 9'; 3' or 474A', and 5'; 3' or 474A', and 6'; 3' or 4'/4A', and 7'; 3' or 474A', and 8' or 9'; 5' and 6'; 5' and 7'; 5', and 8' or 9'; 6' and 7'; 6', and 8' or 9'; and 7', and 8' or 9'.

Additional embodiments disclosed herein include:

AAA. Protective coverings. The protective coverings comprise: a base substrate; and a plurality of metal nanoparticle agglomerates adhered to the base substrate; wherein the base substrate is configured for attachment to a surface subject to infection.

BBB. Methods for providing infection control to a surface. The methods comprise: providing a protective covering comprising a base substrate and a plurality of metal nanoparticle agglomerates adhered to the base substrate; wherein the metal nanoparticle agglomerates are present upon the base substrate in an amount and coverage density effective to promote infection control; and applying the protective covering to a surface subject to infection.

CCC. Methods for making a protective covering. The methods comprise: providing a base substrate configured for attachment to a surface subject to infection; and depositing a plurality of metal nanoparticle agglomerates upon the base substrate such that the metal nanoparticle agglomerates become adhered thereto, the metal nanoparticle agglomerates being present in an amount and coverage density upon the base substrate to provide infection control; wherein the metal nanoparticle agglomerates are deposited upon the base substrate using a spray formulation comprising an aerosolizable fluid medium having metal nanoparticle agglomerates dispersed therein.

DDD. Masks or facial coverings having the protective covering of AAA attached thereto.

EEE. Dry wipes having metal nanoparticle agglomerates adhered thereo.

Each of embodiments AAA, BBB, CCC, DDD and EEE may have one or more of the following additional elements in any combination:

Element 1": wherein the surface subject to infection is a touch surface.

Element 2": wherein the surface subject to infection is a mask or facial covering.

Element 3": wherein the base substrate is a fabric comprising a plurality of fibers.

Element 4": wherein fabric comprises polymer fibers, natural fibers, cotton fibers, cellulosic fibers, or any combination thereof.

Element 5": wherein the fabric is pleated and comprises overlapping pleated layers.

Element 6": wherein the base substrate comprises a material selected from the group consisting of a polymer, a textile, paper, cardboard, and any combination thereof.

Element 7": wherein the base substrate is in a form of a fabric, tape, sheet, VELCRO, or any combination thereof.

Element 8": wherein metal nanoparticles within the metal nanoparticle agglomerates comprise copper nanoparticles, silver nanoparticles, or any combination thereof.

Element 9": wherein the protective covering further comprises NiO, ZnO, TiO$_2$, or any combination thereof.

Element 9A": wherein NiO, ZnO, TiO$_2$, or any combination thereof is present in combination with the metal nanoparticle agglomerates.

Element 10": wherein the metal nanoparticle agglomerates comprise metal nanoparticles, in which at least a majority of the metal nanoparticles range from about 50 nm to about 250 nm in size.

Element 11": wherein the metal nanoparticle agglomerates range from about 1 micron to about 35 microns in size.

Element 12": wherein the metal nanoparticle agglomerates are adhered to the base substrate via an adhesive layer.

Element 13": wherein the metal nanoparticles agglomerates are adhered to a first side of the base substrate and a second side of the base substrate is adapted to contact the surface subject to infection.

Element 13A": wherein the metal nanoparticle agglomerates are adhered to a first side of the base substrate via the adhesive layer, and a second side of the base substrate is adapted to contact the surface subject to infection.

Element 14": wherein the metal nanoparticle agglomerates are adhered to the first side of the base substrate via an adhesive layer.

Element 15": wherein the protective covering further comprises a contact adhesive located upon the second side of the base substrate.

Element 16": wherein the protective covering further comprises metal nanoparticle agglomerates adhered to the second side of the base substrate, optionally wherein the metal nanoparticle agglomerates are admixed with the contact adhesive.

Element 16A": wherein the second side of the base substrate comprises a contact adhesive and optionally metal nanoparticle agglomerates.

Element 17": wherein the metal nanoparticle agglomerates cover about 5% to about 95% of the base substrate by area and at a coverage density of about 0.4 mg/in$^2$ to about 5 mg/in$^2$.

Element 18": a mechanical connector or contact adhesive adapted for attachment of the base substrate to the surface subject to infection.

By way of non-limiting example, exemplary combinations applicable to AAA, BBB, CCC, DDD and EEE include, but are not limited to: 1" or 2", and 3"; 1" or 2", and 3" and 4"; 1" or 2", and 3"-5"; 1" or 2", and 6"; 1" or 2", and 7"; 1" or 2", and 8"; 1" or 2", 8", and 9" or 9A"; "; 1" or 2", and 10"; 1" or 2", 10" and 11"; 1" or 2", 3" and 11"; 1" or 2", and 12"; 1" or 2", and 13" or 13A", optionally in further combination with 14"; 15"; 14" and 15"; 14", 15" or 16" or 16A"; 1" or 2", and 17"; 1" or 2", and 18"; 3" and 6"; 3" and 4"; 3" and 5"; 3"-5"; 3" and 8"; 3", and 9" or 9A"; 3" and 10"; 3" and 11"; 3" and 12"; 3", and 13" or 13A", optionally in further combination with 14", 15", 14" and 15"; or 16" or 16A"; 3" and 17"; 3" and 18"; 6" and 7"; 6" and 8"; 6", and 9" or 9A"; 6" and 10"; 6" and 11"; 6" and 12"; 6" and 13" or 13A", optionally in further combination with 14", 15", 14" and 15"; or 16" or 16A"; 6" and 17"; 6" and 18"; 8", and 9" or 9A"; 8" and 10"; 8" and 11"; 8" and 12"; 8", and 13" or 13A", optionally in further combination with 14", 15", 14" and 15"; or 16" or 16A"; 8" and 17"; 8" and 18"; 10" and 11"; 10" and 12"; 10", and 13" or 13A", optionally in further combination with 14", 15", 14" and 15"; or 16" or 16A"; 11" and 12"; 11", and 13" or 13A", optionally in further combination with 14", 15", 14" and 15"; or 16" or 16A"; 11" and 17"; 11" and 18"; 12", and 13" or 13A", optionally in further combination with 14", 15", 14" and 15"; or 16" or 16A"; 12" and 17"; 12" and 18"; 13" or 13A", and 14"; 13" or 13A", 15"; 13" or 13A", and 14" and 15"; 13" or 13A", and 16" or 16A"; 13" or 13A", and 17"; 13" or 13A", and 18"; and 17" and 18".

To facilitate a better understanding of the present disclosure, the following examples of preferred or representative embodiments are given. In no way should the following examples be read to limit, or to define, the scope of the invention.

EXAMPLES

Figure 13:
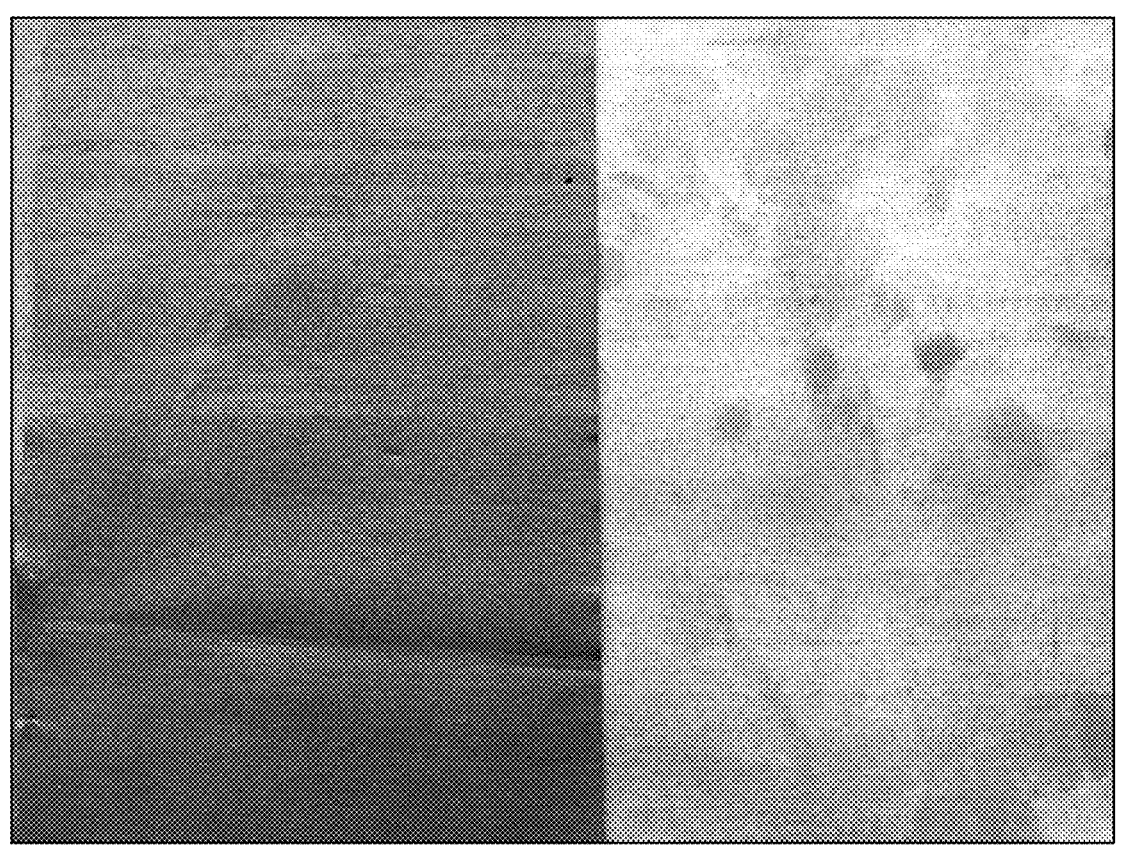
FIG. 13 shows an illustrative photographic image of a fabric having agglomerates of copper nanoparticles adhered thereto, as fabricated (left side of image) and after extended use (right side of image).

Agglomerates of copper nanoparticles in the 50-250 nm size range with a monolayer of amine surfactants on their surfaces and having an agglomerate size of 1-35 microns were adhered to a 55/45 cellulose/polyester fabric blend with an average fiber diameter of about 10 microns using an epoxy adhesive. This may be done via spray coating a suitable ink or dye formulation onto the fibers, or dip coating or gravure coating via a commercial process. The adhesive layer was about 20-50 nm thick, and the metal nanoparticle agglomerates were partially embedded in the adhesive layer with a substantial portion still exposed. The areal coverage of the agglomerates upon the fiber surfaces was about 20-50%. The copper loading upon the fabric ranged from about 1.2 mg/in$^2$ to about 2.7 mg/in$^2$. Depending on size, some of the agglomerates may have the surfactant layer partially removed, thereby resulting in partial oxidation and an overall mixture of copper metal, $Cu_2O$ and CuO species on the fiber surface. The copper metal to oxide ratio may reside in the 1-10% range. Over time, oxidation and dissolution progressively result in fading of the initial dark brown-red color to more light yellow-green. FIG. 13 shows an illustrative photographic image of a fabric having agglomerates of copper nanoparticles adhered thereto, as fabricated (left side of image) and after extended use (right side of image). The nanoparticle-loaded fabric was then subjected to various stability and toxicological tests specified below.

Agglomerates of copper nanoparticles in the 20-150 nm size range with a partially removed monolayer of amine surfactants on their surfaces and having an agglomerate size of 5-15 microns were adhered to a 30/70 cellulose/polyester fabric blend with an average fiber diameter of about 10 microns using an epoxy adhesive. This may be done via spray coating a suitable ink or dye formulation onto the fibers, or dip coating or gravure coating via a commercial process. The adhesive layer was about 50-100 nm thick and the metal nanoparticle agglomerates were partially embedded in the adhesive layer with a substantial portion still exposed. The areal coverage of the agglomerates upon the fiber surfaces is about 30-70%. The copper loading upon the fabric ranged from about 2.3 mg/in$^2$ to about 4.5 mg/in$^2$. Depending on size, some of the agglomerates may be fully or partially oxidized, thereby resulting in an overall mixture of copper metal, $Cu_2O$ and CuO species on the fiber surface. The copper metal to oxide ratio may reside in the 5-25% range.

Agglomerates of copper nanoparticles in the 50-250 nm size range with a monolayer of amine surfactants on their surfaces and having an agglomerate size of 1-35 microns were adhered to a 55/45 cellulose/polyester fabric blend with an average fiber diameter of about 10 microns using a styrene acrylic acid block copolymer adhesive. This may be done via spray coating a suitable ink or dye formulation onto the fibers, or dip coating or gravure coating via a commercial process. The adhesive layer was about 100-250 nm thick, and the metal nanoparticle agglomerates were partially embedded in the adhesive layer with a substantial portion still exposed. The areal coverage of the agglomerates upon the fiber surfaces is about 10-35%. The copper loading upon the fabric ranged from about 1.7 mg/in$^2$ to about 3.5 mg/in$^2$. Depending on size, some of the agglomerates may be fully or partially oxidized, thereby resulting in an overall mixture of copper metal, Cu$_2$O and CuO species on the fiber fabric surface. The copper metal to oxide ratio may reside in the 5-15% range.

Agglomerates of copper nanoparticles in the 50-200 nm size range with a monolayer of amine surfactants on their surfaces and having an agglomerate size of 1-35 microns were adhered to a 100% polypropylene fabric (melt-blown) with an average fiber diameter of about 10 microns using an epoxy adhesive. This may be done via spray coating a suitable ink or dye formulation onto the fibers, or dip coating or gravure coating via a commercial process. The adhesive layer was about 35-150 nm thick, and the metal nanoparticle agglomerates were partially embedded in the adhesive layer with a substantial portion still exposed. The areal coverage of the agglomerates on the fiber surfaces is about 5-30%. The copper loading upon the fabric ranged from about 0.7 mg/in$^2$ to about 1.6 mg/in$^2$. Depending on size, some of the agglomerates may be fully or partially oxidized, thereby resulting in an overall mixture of copper metal, Cu$_2$O and CuO species on the fiber surface. The copper metal to oxide ratio may reside in the 1-5% range.

Agglomerates of copper nanoparticles in the 35-200 nm size range with a monolayer of amine surfactants on their surfaces and having an agglomerate size of 3-25 microns were adhered to a 100% cotton fabric with an average fiber diameter of about 10 microns using a styrene acrylic acid block copolymer adhesive. This may be done via spray coating a suitable ink or dye formulation onto the fibers, or dip coating or gravure coating via a commercial process. The adhesive layer was about 50-150 nm thick, and the metal nanoparticle agglomerates were partially embedded in the adhesive layer with a substantial portion still exposed. The areal coverage of the agglomerates upon the fiber surfaces was about 40-75%. The copper loading upon the fabric ranged from about 2.7 mg/in$^2$ to about 4.5 mg/in$^2$. Depending on size, some of the agglomerates may be fully or partially oxidized, thereby resulting in an overall mixture of copper metal, Cu$_2$O and CuO species on the fiber surface. The copper metal to oxide ratio may be in the 3-25% range.

When the foregoing fabrics are utilized as dry wipes for disinfection of a hard surface, wiping the hard surface for just 5 seconds may result in full sterilization of a wide range of microbes, viruses and bacteria. Depending on the frequency of use, such dry wipes may remain effective for up to about 30 days. After use, the dry wipes may self-sterilize (e.g., in about 5 minutes or less) for frequent and rapid reuse. Since the pathogens are killed or inactivated upon contact, transfer and cross-contamination is unlikely to occur.

Stability testing. A 6"×6" sheet of fabric was tumbled in water for 8 hours. Only 1.4% of the available copper by weight (0.54 mg) was released into the water.

Shedding was also determined by exposing the fabric to simulated breathing conditions (8.4 and 40.8 m/min face velocity gas flow) and analyzing a filter trap for liberated copper by SEM or EDS. The shedding tests did not reveal detectable liberation of copper from the fabric.

VOCs. No volatile organic compounds (VOCs) from a battery of 70 standard VOCs were detected as being released from the fabric when tested under standard conditions.

Direct exposure to cell growth media. A piece of fabric was first soaked in supplemented cell growth media for up to an hour and then removed. Thereafter, Vero cells or Calu-3 lung epithelial cells were immersed in the cell growth media and incubated overnight in a CO$_2$ incubator. Cell viability was determined by assessing ATP production using a luminescence assy. The luminescence assay did not reveal a substantial change in cell viability.

Efficacy. Efficacy of the fabric against a panel of bacterial and viral pathogens was tested. The panel included gram-positive, gram-negative, and antibiotic-resistant bacteria, bacteriophages as representatives of non-enveloped viruses, enveloped viruses such as H1N1 flu, H3N2 flu, and SARS-CoV-2, and non-enveloped viruses such as feline calicivirus. In all cases, >99% kill rates were observed within 30 seconds, and full efficacy was maintained over 15 days of repeated daily exposure. The efficacy was >99.9% over a standard EPA exposure time of 2 hours against *Staphylococcus aureus* (ATCC 6538), *Enterobacter aerogenes* (ATCC 13048), *Pseudomonas aeruginosa* (ATCC 15442), Methicillin Resistant *Staphylococcus aureus* MRSA (ATCC 33592), and *Escherichia coli* O157:H7 (ATCC 35150). The fabric maintained substantially 100% of the original efficacy against repeated viral inocculations (27M PFUs; H1N1, H3N2 and feline calicivirus) or bacterial loads introduced to the fabric over the course of 30 days. The fabric maintained >99.9% efficacy against *Staphylococcus aureus* and *Klebsiella aerogenes* after months of daily high-touch use and moisture exposure with visible wear. An inactivation rate of substantially 100% was realized against human wound pathogens such as *Acinetobacter baumannii, Klebsiella pneumonia, Pseudomonas aeruginosa, Enterococcus faecalis,* Methicillin-resistant *Staphylococcus aureus* (MRSA), and *Staphylococcus epidermidis* over 24 hours.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the features of the present disclosure are presented herein. Not all features of a physical implementation are described or shown in this application for the sake of clarity. It is understood that in the development of a physical embodiment incorporating the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The disclosure herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A protective covering comprising:
a base substrate; and
a plurality of metal nanoparticle agglomerates comprising a plurality of metal nanoparticles having a surfactant coating thereon adhered to the base substrate; and
an attachment promotor selected from the group consisting of an adhesive and a mechanical connector;
wherein a loading of the metal nanoparticles agglomerates on a surface of the base substrate includes a coverage density ranging from 0.03 mg/in$^2$ to 10 mg/in$^2$;
wherein the metal nanoparticle agglomerates range from about 1 micron to about 35 microns in size; and
wherein the base substrate is configured for attachment to a mask or facial covering with the attachment promotor.

2. The protective covering of claim 1, wherein the base substrate is a fabric comprising a plurality of fibers.

3. The protective covering of claim 2, wherein the fabric is pleated and further comprises overlapping pleated layers.

4. The protective covering of claim 1, wherein the metal nanoparticles within the metal nanoparticle agglomerates comprise copper nanoparticles, silver nanoparticles, or any combination thereof.

5. The protective covering of claim 1, wherein at least a majority of the metal nanoparticles range from about 50 nm to about 250 nm in size.

6. The protective covering of claim 1, wherein the metal nanoparticle agglomerates are adhered to the base substrate via an adhesive layer.

7. The protective covering of claim 1, wherein the metal nanoparticles agglomerates are adhered to a first side of the base substrate and a second side of the base substrate is adapted to contact the mask or facial covering.

8. The protective coating of claim 7, wherein the metal nanoparticle agglomerates are adhered to the first side of the base substrate via an adhesive layer.

9. The protective covering of claim 7, wherein the attachment promotor is a contact adhesive located upon the second side of the base substrate.

10. A mask or facial covering having the protective covering of claim 1 attached thereto.

11. A method comprising:
providing a protective covering comprising a base substrate, a plurality of metal nanoparticle agglomerates comprising a plurality of metal nanoparticles having a surfactant coating thereon adhered to the base substrate, and an attachment promotor selected from the group consisting of an adhesive and a mechanical connector;
wherein the metal nanoparticle agglomerates are present upon the base substrate to promote infection control;
wherein a loading of the metal nanoparticles agglomerates on a surface of the base substrate includes a coverage density ranging from 0.03 mg/in$^2$ to 10 mg/in$^2$;
wherein the metal nanoparticle agglomerates range from about 1 micron to about 35 microns in size; and
attaching the protective covering to a mask or facial covering using the attachment promotor.

12. The method of claim 11, wherein the metal nanoparticles within the metal nanoparticle agglomerates comprise copper nanoparticles, silver nanoparticles, or any combination thereof.

13. The method of claim 11, wherein at least a majority of the metal nanoparticles range from about 50 nm to about 250 nm in size.

14. The method of claim 11, wherein the metal nanoparticle agglomerates are adhered to the base substrate via an adhesive layer.

15. The method of claim 11, wherein providing the protective covering further comprises:
providing the base substrate configured for attachment to the mask or facial covering; and
depositing the plurality of metal nanoparticle agglomerates upon the base substrate such that the metal nanoparticle agglomerates become adhered thereto;
wherein the metal nanoparticle agglomerates are deposited upon the base substrate using a spray formulation comprising an aerosolizable fluid medium having metal nanoparticle agglomerates dispersed therein.

* * * * *